(12) United States Patent
Yamamoto et al.

(10) Patent No.: US 7,689,976 B2
(45) Date of Patent: Mar. 30, 2010

(54) COMPILER APPARATUS AND LINKER APPARATUS

(75) Inventors: Yasuhiro Yamamoto, Kyoto (JP); Hajime Ogawa, Suita (JP); Taketo Heishi, Osaka (JP); Shohei Michimoto, Takatsuki (JP)

(73) Assignee: Panasonic Corporation, Osaka (JP)

( * ) Notice: Subject to any disclaimer, the term of this patent is extended or adjusted under 35 U.S.C. 154(b) by 868 days.

(21) Appl. No.: 10/950,397

(22) Filed: Sep. 28, 2004

(65) Prior Publication Data
US 2005/0086651 A1  Apr. 21, 2005

(30) Foreign Application Priority Data
Oct. 16, 2003 (JP) .............................. 2003-356921

(51) Int. Cl.
G06F 9/45 (2006.01)
G06F 9/44 (2006.01)

(52) U.S. Cl. ...................... 717/141; 717/151; 717/162

(58) Field of Classification Search .................. 717/141
See application file for complete search history.

(56) References Cited

U.S. PATENT DOCUMENTS

| 5,649,137 | A | * | 7/1997 | Favor et al. .................. 712/207 |
| 5,848,275 | A | | 12/1998 | Maydan et al. |
| 6,282,707 | B1 | | 8/2001 | Isozaki |
| 6,301,652 | B1 | * | 10/2001 | Prosser et al. ................ 712/204 |
| 6,438,655 | B1 | * | 8/2002 | Nicol et al. .................. 711/136 |
| 6,530,075 | B1 | * | 3/2003 | Beadle et al. ................ 717/114 |
| 6,574,682 | B1 | * | 6/2003 | Chan ............................ 710/22 |
| 6,704,833 | B2 | * | 3/2004 | Huck ............................ 711/3 |
| 6,708,330 | B1 | * | 3/2004 | Moberg et al. .............. 717/158 |
| 6,813,763 | B1 | * | 11/2004 | Takahashi et al. ........... 717/151 |

(Continued)

FOREIGN PATENT DOCUMENTS

EP  0 936 543  8/1999

(Continued)

OTHER PUBLICATIONS

"Using cache line coloring to perform aggressive procedure inlining", Aydin et al., Mar. 2000, pp. 62-71. Online retrieved at <http://delivery.acm.org/10.1145/350000/346046/p62-aydin.pdf>.*

(Continued)

Primary Examiner—Tuan Q Dam
Assistant Examiner—Thuy Dao
(74) Attorney, Agent, or Firm—Wenderoth, Lind & Ponack, L.L.P.

(57) ABSTRACT

A compiler capable of increasing the hit rate of the cache memory is provided that targets a computer having a cache memory, and that converts a source program into an object program. The compiler causes a computer to analyze group information that is used for grouping data objects included in the source program, and places the data objects into groups based on a result of the analysis. The compiler also causes the computer to generate an object program based on a result of the grouping, where the object program does not allow data objects belonging to different groups to be laid out in any blocks with the same set number on the cache memory.

25 Claims, 24 Drawing Sheets

U.S. PATENT DOCUMENTS 7,107,583 B2 * 9/2006 Hobbs et al. ................. 717/150
7,254,806 B1 * 8/2007 Yates et al. ................. 717/136

FOREIGN PATENT DOCUMENTS

| | | |
|---|---|---|
| JP | 7-129410 | 5/1995 |
| JP | 11-232117 | 8/1999 |

OTHER PUBLICATIONS

"Improving cache hit ratio by extended referencing cache lines", Wang et al., Apr. 2003, pp. 118-123. Online retrieved at <http://delivery.acm.org/10.1145/770000/767619/p118-wang.pdf>.*

"Performance, energy, and reliability tradeoffs in replicating hot cache lines", Zhang et al., Oct. 2003, pp. 309-317. Online retrieved at <http://delivery.acm.org/10.1145/960000/951750/p309-zhang.pdf>.*

* cited by examiner

FIG. 8

```
#pragma _overlap_access_object a, b, c
int a[32], b[32], c[32];
void test(void)
{
    int i;
    for(i=0;i<32;i++){
            a[i]=b[i] * c[i];
    }
}
```

FIG. 9

| Group | 1 set (=128 bytes) | | | |
|---|---|---|---|---|
| data_a | a[0] | a[1] | . . . | a[31] |
| data_b | b[0] | b[1] | . . . | b[31] |
| data_c | c[0] | c[1] | . . . | c[31] |

FIG. 10

```
.data_a    SECTION
           SET    0          //Set number    ⎫
           DS     128                        ⎬ Lay object in set 0
_a                                           ⎭

.data_b    SECTION
           SET    1          //Set number    ⎫
           DS     128                        ⎬ Lay object in set 1
_b                                           ⎭

.data_c    SECTION
           SET    2          //Set number    ⎫
           DS     128                        ⎬ Lay object in set 2
_c                                           ⎭
```

FIG. 11

```
#pragma _cache_set_number=0 i
#pragma _cache_set_number=1 j
#pragma _cache_set_number=2 k
int i[32], j[32], k[32];
void test(void)
{
    int n;
    for(n=0;n<32;n++){
            i[n]=j[n]+k[n];
    }
}
```

FIG. 12

```
#pragma _cache_set_monopoly x, y
int x[32], y[32];
void test(void)
{
    int i;
    for(i=0;i<32;i++){
            x[i]=y[i] * 2;
    }
}
```

FIG. 18

```
a:0x80000010,0x800001ff
b:0x80000100,0x800001ff
c:0x80001000,0x80001fff
d:0x80000030,0x800001ff
e:0x80001000,0x80001fff
```
66

FIG. 21

```
.data_a   SECTION
          SET   0         // Set number  ⎫
          DS    128                      ⎬ Lay object in set 0
                                         ⎭
.data_b   SECTION
          SET   1         // Set number  ⎫
_b        DS    128                      ⎬ Lay object in set 1
_c        DS    128                      ⎭
.data_d   SECTION
          SET   2         // Set number  ⎫
_d        DS    128                      ⎬ Lay object in set 2
_e        DS    128                      ⎭
```

FIG. 25

```
.data_a   SECTION
          SET   0         // Set number  ⎫
_a        DS    64                       ⎬ Lay object in set 0
                                         ⎭
.data_b   SECTION
          SET   1         // Set number  ⎫
_b        DS    32                       ⎬ Lay object in set 1
_c        DS    64                       ⎭
.data_d   SECTION
          SET   2         // Set number  ⎫
_d        DS    16                       ⎬ Lay object in set 2
_e        DS    120                      ⎭
.data_f   SECTION
          SET   3         // Set number  ⎫
_f        DS    8                        ⎬ Lay object in set 3
                                         ⎭
```

COMPILER APPARATUS AND LINKER APPARATUS

BACKGROUND OF THE INVENTION (1) Field of the Invention

The present invention relates to a compiler that converts a source program written in high-level language such as the C++ language into an executable program written in machine language, and particularly to a compiler that converts said source program into an executable program that are executed on a computer having a cache memory.

(2) Description of the Related Art

A variety of compilers for computers having cache memory have been proposed so far. For example, there is a compiler that lays out a set of data items that are accessed at similar timings (e.g. a set of data items with overlapping lifetimes) in contiguous locations on the main memory (for example, see Japanese Laid-Open Patent application No. 7-129410). By laying out, in consecutive locations on the main memory, a set of data items that are accessed at similar timings, these data items are laid out on the same block on the cache memory at one time. Accordingly, it becomes possible to increase the hit rate of the cache memory.

However, if addresses on the main memory of the respective data items that are accessed at similar timings are determined in a way that enables such data items to be laid out on the same block, and if the total size of these data items is larger than the size of such block, it is impossible to write all data included in such data items to the same block at one time. This causes a cache conflict on the same block between or among data included in the same data items, resulting in frequent cache misses. This problem is especially notable in cache memories using a direct mapping scheme in which only one block is associated with one set.

SUMMARY OF THE INVENTION

The present invention has been conceived in view of solving the above problem whose object is to provide a compiler apparatus that is capable of avoiding conflicts on the same block and of increasing the hit rate of cache memory.

In order to achieve the above object, the compiler apparatus according to the present invention is a compiler apparatus that targets a computer having a cache memory and that converts a source program into an object program, comprising: a grouping unit operable to analyze grouping information that is used for grouping data objects included in the source program, and places said data objects into groups based on a result of said analysis; and an object program generation unit operable to generate the object program based on a result of the grouping performed by the grouping unit, said object program not allowing data objects belonging to different groups to be laid out in any blocks with the same set number on the cache memory.

With the above configuration, if the grouping information includes information for placing data objects with overlapping lifetimes in different groups, for example, the data objects with overlapping lifetimes are to be placed in set numbers on the cache memory that are different from each other, according to such information. Accordingly, there does not occur any conflicts in which data objects whose lifetimes overlap contend for a block with the same set number on the cache memory and try to flush other data objects. This makes it possible to cause fewer cache misses and therefore to increase the hit rate of the cache memory. Note that in the present specification and following claims, "object/data object" refers to data such as variable and data array.

Moreover, the grouping unit may analyze a directive to the compiler apparatus included in the source program, and place the data objects included in the source program into the groups based on a result of said analysis of the directive. More preferably, the directive is a pragma command for placing a set of one or more data objects specified in said pragma command into one or more groups on a line size basis of the cache memory, and the grouping unit places said specified set of one or more data objects into said one or more groups on a line size basis of the cache memory, based on the pragma command included in the source program.

When an executable program is executed, data objects which are considered by the user to be accessed at similar timings according to a pragma command, are to be laid out in blocks with different set numbers on the cache memory. Accordingly, there does not occur any conflicts in which data objects which are deemed as being accessed at similar timings contend for a block with the same set number on the cache memory and try to flush other data objects. This makes it possible to cause fewer cache misses and therefore to increase the hit rate of the cache memory.

It is also possible that the directive is a pragma command that allows data objects specified in said pragma command to be laid out in blocks with mutually different set numbers and that allows said specified data objects to make exclusive use of the respective blocks, that the grouping unit includes: a grouping processing unit operable to place said specified data objects into groups on a data object basis, based on the pragma command included in the source program; and a set number setting unit operable to set different set numbers to the respective groups, and that the object program generation unit generates the object program that allows the data objects belonging to the respective groups to be laid out in the blocks with the set numbers on the cache memory corresponding to the respective groups and that allows said data objects to make exclusive use of the respective blocks.

With the above configuration, such an object program is generated as enables data objects specified in the pragma command to monopolize the blocks with the set numbers in the cache memory that are set by the set number setting unit. Accordingly, it becomes possible for frequently-used data objects to monopolize the cache memory, as well as to prevent such data objects from being flushed from the cache memory and to achieve high-speed processing.

Moreover, the grouping unit may analyze profile information that is generated when a machine language instruction sequence generated from the source program is executed, and place the data objects included in the source program into the groups based on a result of said analysis of the profile information. More preferably, the profile information includes information related to access frequencies of the respective data objects, and the grouping unit places, into mutually different groups, data objects whose access frequencies are equal to or greater than a predetermined threshold.

When the executable program is executed, data objects with high frequencies are to be laid out in blocks with different set numbers on the cache memory. Accordingly, it becomes possible for data objects with high access frequencies to monopolize blocks on the cache memory, as well as to prevent such frequently-used data objects from being flushed from the cache memory. This makes it possible to prevent cache misses and to increase the hit rate of the cache memory.

Furthermore, it is also possible that the profile information includes information related to lifetimes of the respective data objects, and that the grouping unit places, into mutually different groups, data objects whose lifetimes overlap.

With the above configuration, data objects whose lifetimes overlap are to be laid out in blocks with set numbers that are different from each other. Accordingly, there does not occur any conflicts in which data objects that are accessed at the same timings contend for a block with the same set number and try to flush other data objects. This makes it possible to prevent cache misses and to increase the hit rate of the cache memory.

More preferably, the grouping unit analyzes an overlapping of lifetimes of the respective data objects included in the source program based on the source program, and places, into mutually different groups, data objects whose lifetimes overlap.

With the above configuration, data objects whose lifetimes overlap are to be laid out in blocks with set numbers that are different from each other. Accordingly, there does not occur any conflicts in which data objects that are accessed at the same timings contend for a block with the same set number and try to flush other data objects. This makes it possible to prevent cache misses and to increase the hit rate of the cache memory.

Note that not only is it possible to embody the present invention as the above compiler apparatus that generates the characteristic object program, but also as a compilation method that includes, as its steps, the characteristic units equipped to the above compiler apparatus, and as a program that causes a computer to function as the above compiler apparatus. It should be noted that such program can be distributed on a recording medium such as CD-ROM and over a transmission medium such as the Internet.

As described above, the present invention is capable of increasing the hit rate of a cache memory at program execution time.

Furthermore, the present invention is also capable of achieving high-speed processing.

The disclosure of Japanese Patent Application No. 2003-356921 filed on Oct. 16, 2003 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 8 is a diagram showing an example source program in which a pragma "#pragma _overlap_access_object" is described;

FIG. 9 is a diagram showing grouped objects;

FIG. 10 is a diagram showing exemplary assembler codes generated from the source program shown in FIG. 8;

FIG. 11 is a diagram showing an example source program in which a pragma "#pragma _cache_set_number" is described;

FIG. 12 is a diagram showing an example source program in which a pragma "#pragma _cache_set_monopoly" is described;

FIG. 18 is a diagram showing an example of profile data related to lifetimes of objects;

FIG. 21 is a diagram showing exemplary assembler codes generated on the basis of the profile data shown in FIG. 18;

FIG. 25 is a diagram showing exemplary assembler codes generated on the basis of the overlapping of the lifetimes of the objects shown in FIG. 23.

DESCRIPTION OF THE INVENTION

First Embodiment

Hardware Configuration

Figure 1:
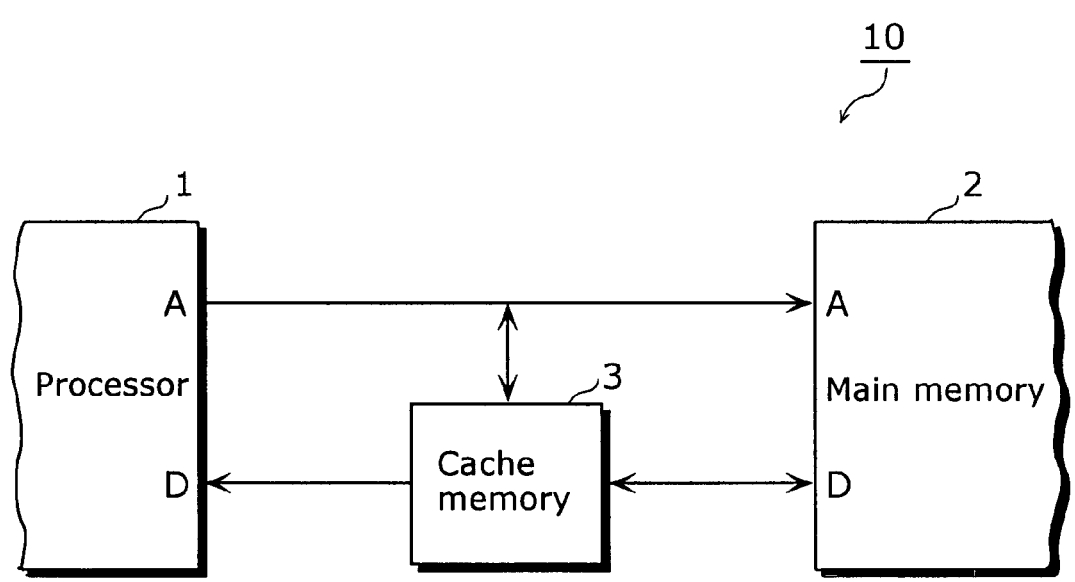
FIG. 1 is a block diagram showing a partial hardware configuration of a target computer of a compiler system according to a first embodiment of the present invention.

FIG. 1 is a block diagram showing a partial hardware configuration of a target computer of a compiler system according to the first embodiment of the present invention. A computer 10 is comprised of a processor 1, a main memory 2, and a cache memory 3. The configurations of the processor 1 and the main memory 2 are the same as those of the ordinary processors, and therefore detailed descriptions thereof are omitted here.

Figure 2:
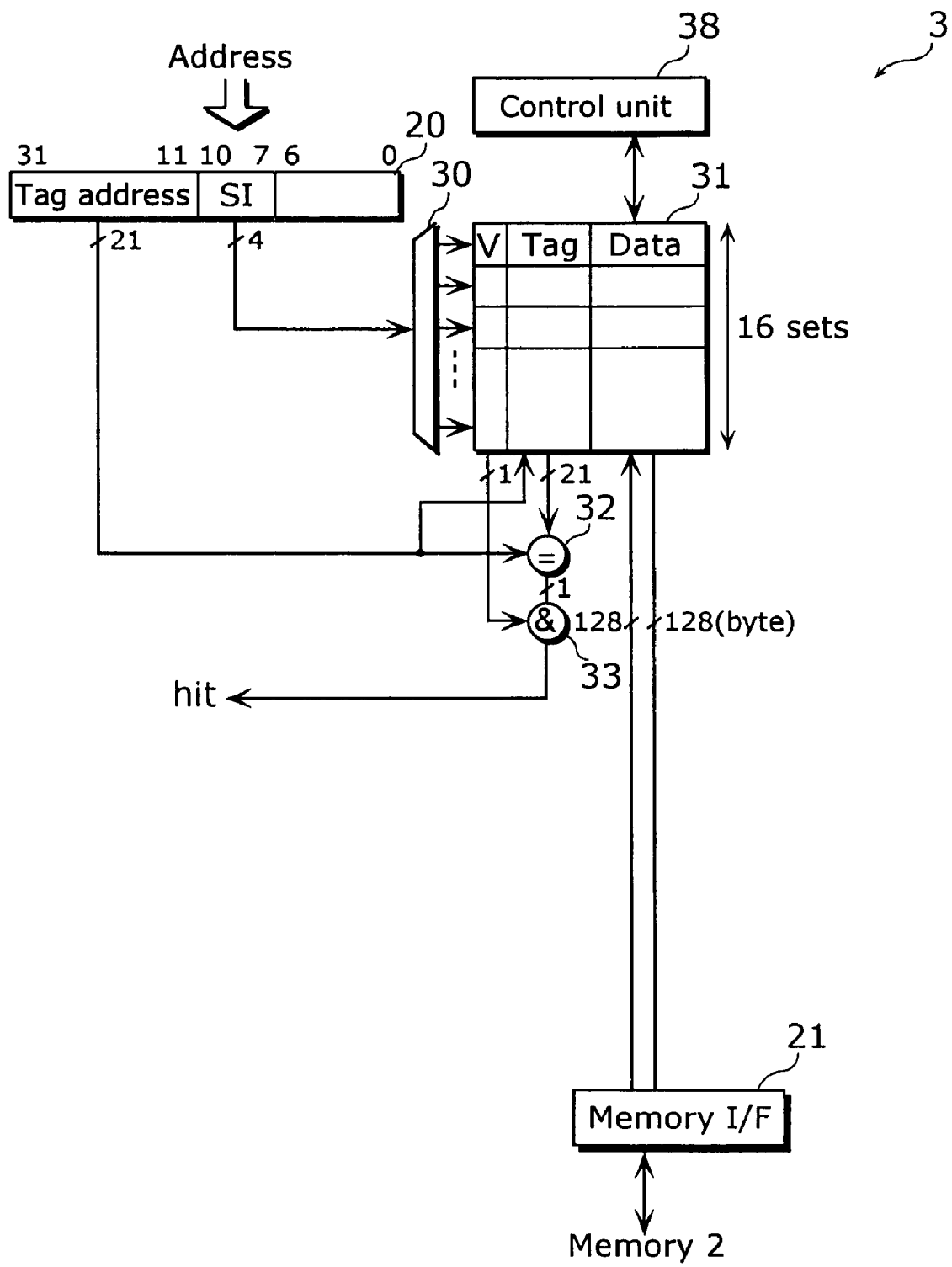
FIG. 2 is a block diagram showing a hardware configuration of a cache memory.

FIG. 2 is a block diagram showing a hardware configuration of the cache memory 3. The cache memory 3, which is a cache memory using a direct mapping scheme (one-way set associative scheme), is equipped with an address register 20, a decoder 30, a memory unit 31, a comparator 32, an AND circuit 33, a control unit 38, and a memory I/F (interface) unit 21.

The address register 20 is a register that holds an access address that is used to make an access to the main memory 2.

This access address shall be 32 bits. As shown in FIG. 2, an access address includes the following elements in order starting with the most significant bit: a 21-bit tag address; a 4-bit set index (indicated as "SI" in the drawing); and the other 7-bit value. Here, the tag address is an address for associating the main memory 2 with the memory unit 31 of the cache memory 3. The set index (SI) is an address that specifies a set (line or block) on the memory unit 31.

Figure 3:
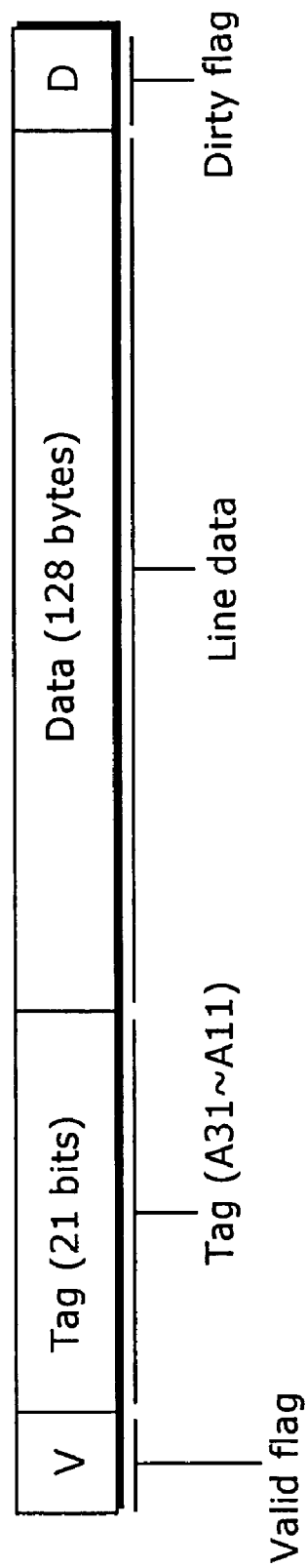
FIG. 3 is a diagram showing a bit structure of each block included in the cache memory.

The memory unit 31 includes 16 (=24) sets (16 blocks here, since a fully associative scheme is employed), since a set index (SI) is made up of 4 bits. FIG. 3 is a diagram showing the bit structure of each block included in the memory unit 31. As FIG. 3 shows, one block includes a valid flag V, a 21-bit tag, 128-byte line data, and a dirty flag D.

The valid flag V indicates whether the block is valid or not. The tag is a copy of a 21-bit tag address. The line data is a copy of 128-byte data stored in the main memory 2 whose start address is the address held in the address register 20. The dirty flag D indicates whether writing has been performed to the block or not, i.e. whether or not it is necessary for line data that has been cached to the block to be written back to the main memory 2 since it is now different from data stored in the main memory 2 because of the fact that the writing has been performed.

Here, the tag address indicates a location on the main memory 2 of line data to be mapped to the memory unit 31 (the size of such location is determined by the number of sets×the size of line data). The size of the location is 2 k bytes, which is determined by a 10-bit address that starts from the next lower bit of the least significant bit of the tag address. Moreover, the set index (SI) refers to one of the 16 sets. A set specified by the tag address and the set index (SI) serves as a unit of replacement. The size of line data is 128 bytes, which is determined by the next lower 7 bits of the least significant bit of the set index (SI). Assuming that one word is 4 bytes, one line data is made up of 32 words.

The decoder 30 shown in FIG. 2 decodes the 4 bits of the set index (SI), and selects one of the 16 sets stored in the memory unit 31.

The comparator 32 compares the tag address in the address register 20 with the tag included in the set selected by the set index (SI) to see if they match or not.

The AND circuit 33 carries out the logical AND between the valid flag (V) and a result of the comparison performed by the comparator 32. When the logical AND is 1, it means that there exists, in the memory unit 31, line data corresponding to the tag address in the address register 20 and to the set index (SI). When the logical AND is 0, it means that a cache miss has occurred.

The control unit 38 exercises an overall control of the cache memory 3.

<Overview of Data Layout Method>

Figure 4:
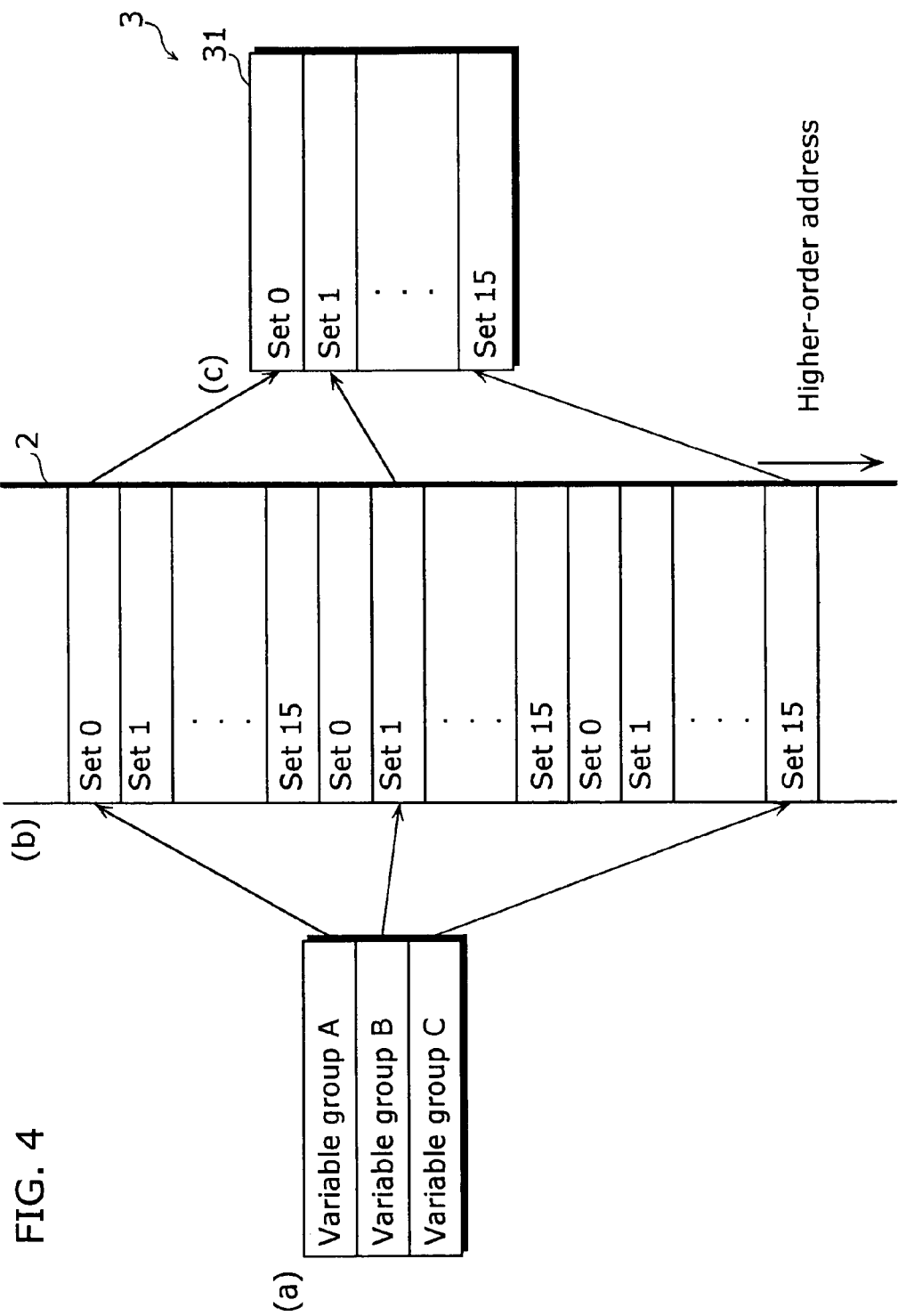
FIG. 4 is a diagram for explaining an overview of a method used in the compiler system when laying out data items on a source program.

FIG. 4 is a diagram for explaining an overview of a method used in the compiler system according to the first embodiment when laying out data items on the source program. Suppose, as shown in (a) in FIG. 4, that some of the variables included in the source program form three variable (object) groups (variable groups A to C) to which access is made at similar timings. The size of data included in each variable group shall be 128 bytes, which is the size of line data in the cache memory 3. The compiler system generates machine language instructions that enable these three variable groups to be written to blocks with different set numbers when they are written to the cache memory 3. For example, as shown in (b) in FIG. 4, assuming that the variable groups A, B, and C are, respectively, laid out in blocks corresponding to sets 0, 1, and 15 on the cache memory 3, the variable groups A, B, and C are to be stored into storage locations on the main memory 2 that enable them to be written to the blocks corresponding to the sets 0, 1, and 15 when they are written to the cache memory 3. Therefore, as shown in (c) in FIG. 4, when written from the main memory 2 to the cache memory 3, the variable groups A, B, and C are written to the blocks corresponding to the sets 0, 1, and 15.

<Compiler System>

Figure 5:
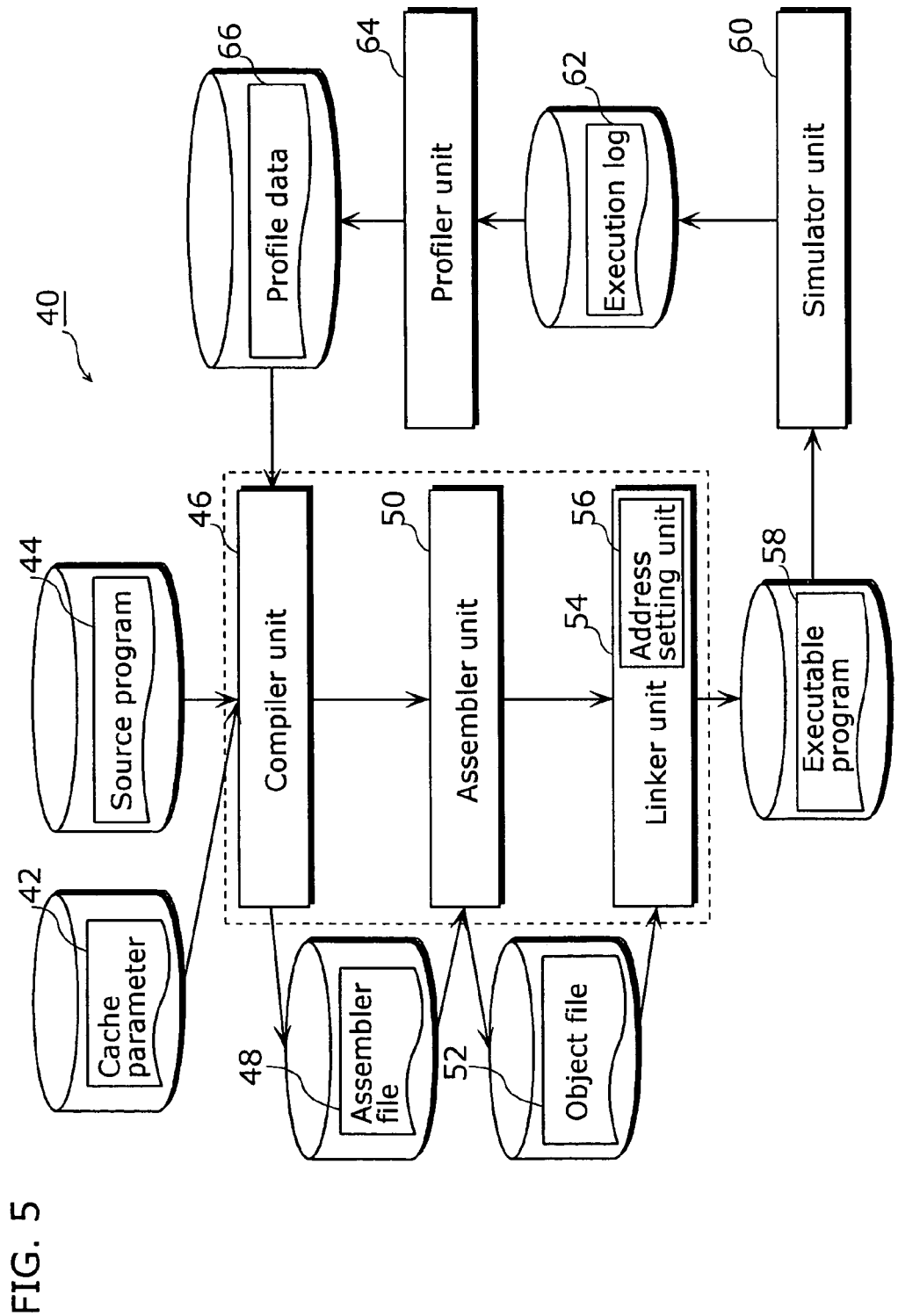
FIG. 5 is a functional block diagram showing a configuration of the compiler system.

FIG. 5 is a functional block diagram showing a configuration of the compiler system according to the first embodiment. A compiler system 40 is a system for converting a source program 44 into an executable program 58 that is written in machine language executable by the computer 10 shown in FIG. 1. Such compiler system 40 is formed of a compiler unit 46, an assembler unit 50, a linker unit 54, a simulator unit 60, and a profiler unit 64. Note that it is possible to implement each of these processing units as a program that runs on the processor 1 of the computer 10. Note, however, that the compiler system 40 may be a cross-compiler system in which the computer 10 is a target computer and the executable program 58 is executed by another computer.

The compiler unit 46 receives the following data items as inputs, and converts the source program 44 into an assembler file 48 written in assembly language, based on such received data items: the source program 44 written in high-level language such as the C++ language; a cache parameter 42 made up of parameter information related to the cache memory 3 (e.g. the number of sets, and the size of line data, and the like); and profile data 66 that indicates a result of analysis performed at the time of executing the executable program 58.

The assembler unit 50 creates an object file 52 that is a result of converting the assembler file 48 written in assembly language into a machine language file.

The linker unit 54 links one or more object files 52 (only one object file 52 is illustrated in FIG. 5) to generate the executable program 58. Note that the linker unit 54 is equipped with an address setting unit 56, which determines addresses on the main memory 2 for a set of objects (a set of data items or a set of instructions) to which access is made at similar timings, so that they can be laid out in blocks with different set numbers on the cache memory 3.

The simulator unit 60 virtually executes the executable program 58, and outputs an execution log 62.

The profiler unit 64 generates, by analyzing the execution log 62, the profile data 66 that serves as a hint for obtaining an optimum executable program 58, such as the access frequencies of variables and the lifetimes of variables.

<Compiler Unit>

Figure 6:
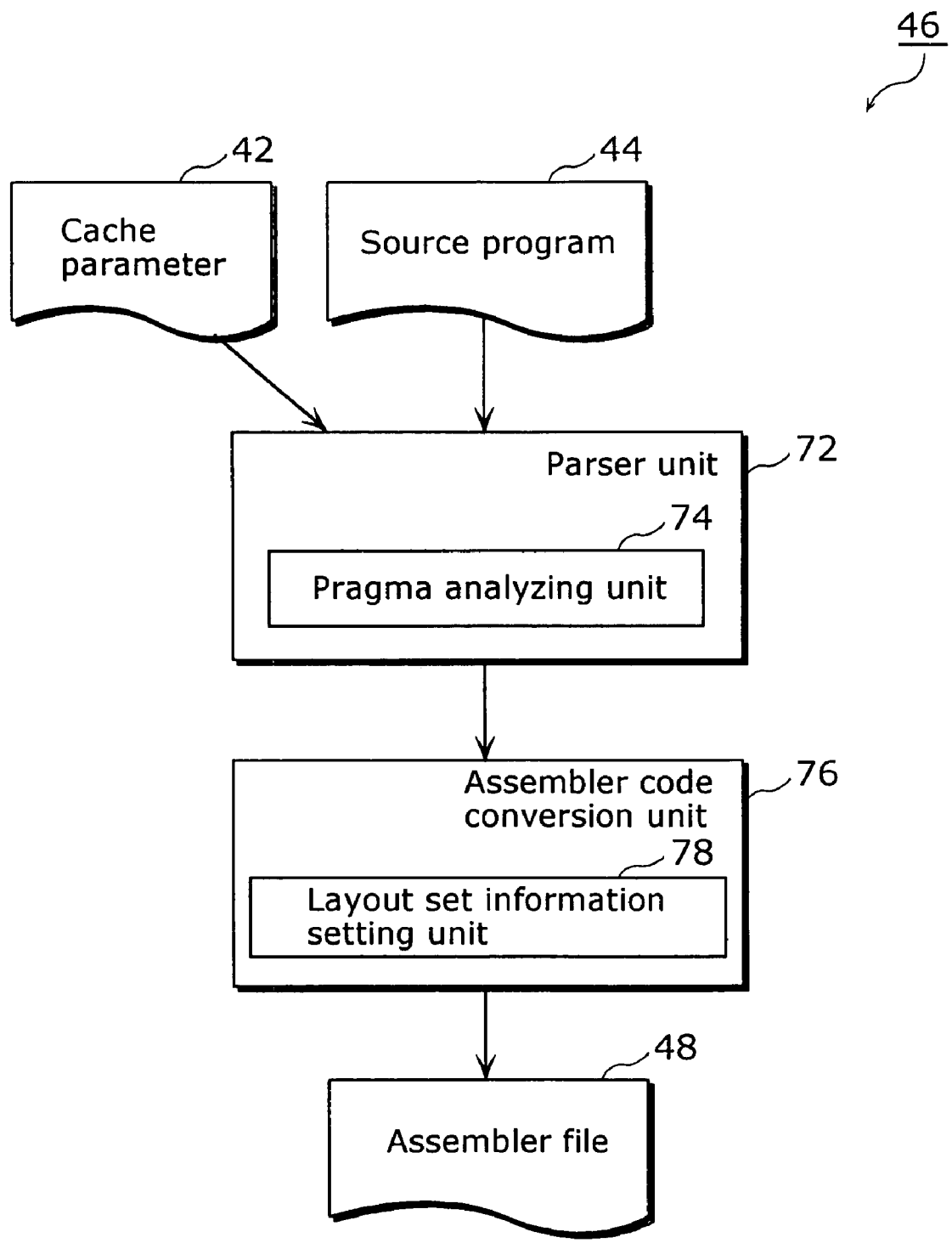
FIG. 6 is a functional block diagram showing a configuration of a compiler unit according to the first embodiment.

FIG. 6 is a functional block diagram showing a configuration of the compiler unit 46. The compiler unit 46 according to the first embodiment, which is a processing unit that converts the source program 44 into the assembler file 48 based on the cache parameter 42 and the source program 44, has a parser unit 72 and the assembler code conversion unit 76.

The parser unit 72, which is a pre-processing unit that extracts a reserved word (keyword) and the like from the source program 44 to be compiled and performs lexical analysis of the extracted word, has a pragma analyzing unit 74 that analyzes a pragma command, in addition to the analyzing functionality of ordinary compilers.

Note that "pragma (or pragma command)" is a directive to the compiler unit 46 that is a character string starting with "#pragma" and that can be arbitrarily specified (placed) by the user within the source program 44.

The assembler code conversion unit 76 is a processing unit that converts each statement in the source program 44 passed from the parser unit 72 into an assembly language code after converting each statement into an intermediate code, and outputs the resultant as the assembler file 48. In addition to the conversion functionality of ordinary compilers, the assembler code conversion unit 76 is equipped with a layout set information setting unit 78 that generates an assembler code that enables an object specified by a pragma analyzed by the pragma analyzing unit 74 to be laid out in a block on the cache memory 3 with an appropriate set number.

Here, there shall be the following three types of pragmas:
(1) #pragma _overlap_access_object a, b, c
(2) #pragma _cache_set_number=n a
where "n" denotes a set number (0-15), and
(3) # pragma _cache_set_monopoly=a,b Pragma (1) indicates that objects "a", "b", and "c" are accessed at similar timings. Note that the number of objects may be any number as long as it is equal to or greater than 1. The meaning of this pragma is given later. Pragma (2) is used to specify that the object "a" should be laid in a block with the "n"th set number on the cache memory 3. Pragma (3) is used to specify that the objects "a" and "b" should be laid in blocks with different set numbers on the cache memory 3 and that these blocks should be monopolized by the objects "a" and "b", i.e. no object other than the objects "a" and "b" should be laid on these blocks.

Figure 7:
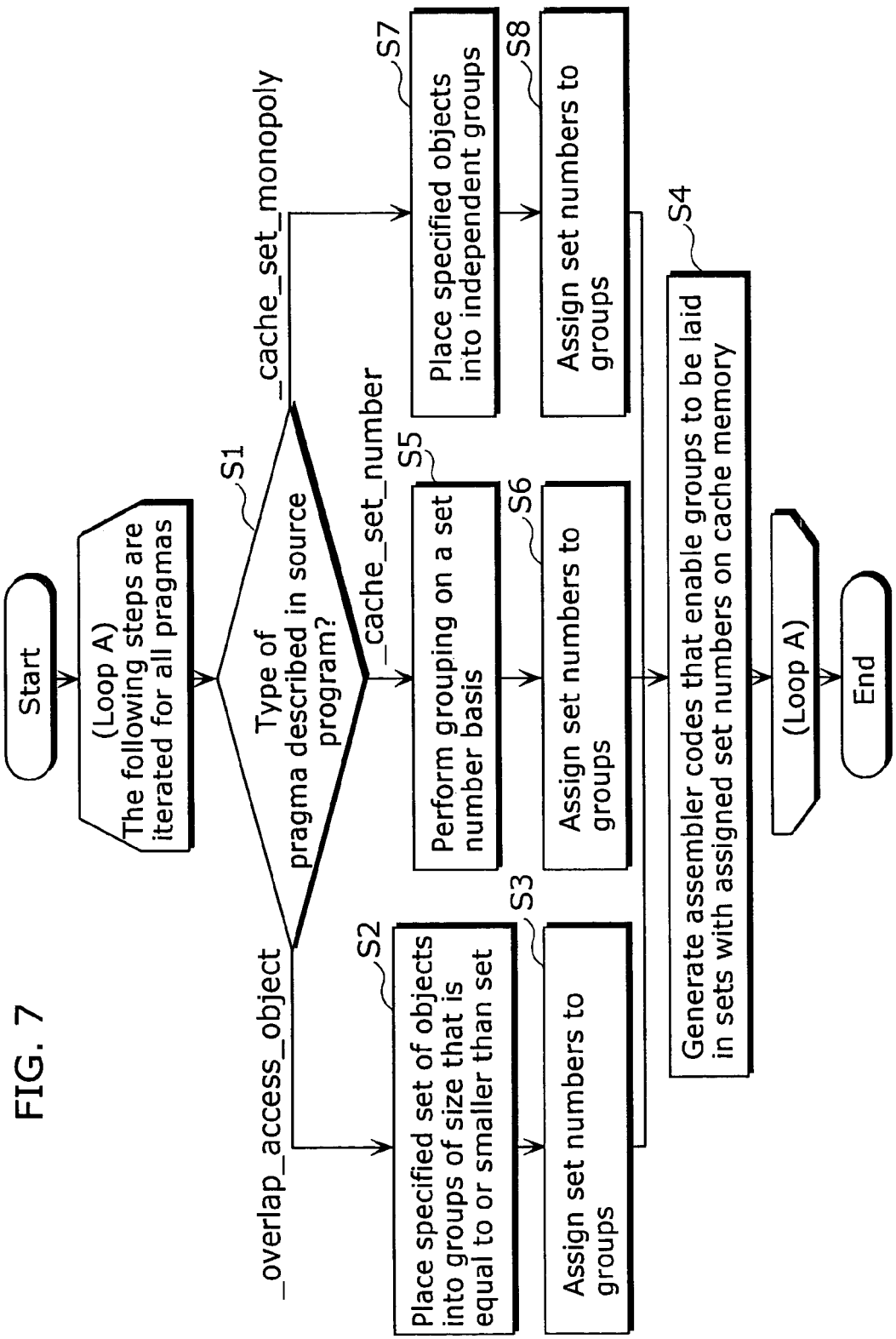
FIG. 7 is a flowchart showing processing performed by a pragma analyzing unit and a layout set information setting unit shown in FIG. 6.

FIG. 7 is a flowchart showing processing performed by the pragma analyzing unit 74 and the layout set information setting unit 78 shown in FIG. 6.

The pragma analyzing unit 74 analyzes the type of a pragma described on the source program 44 (S1). When the type of such pragma is Pragma (1) (_overlap_access_object in S1), the pragma analyzing unit 74 places a set of objects that are indicated after "#pragma _overlap_access_object" into groups in a way that allows the size of each group to be equal to or lower than an equivalence of one set of line data (i.e. 128 bytes) on the cache memory 3 (S2). The following gives a more specific description of this grouping processing (S2).

FIG. 8 is a diagram showing an example source program in which a pragma categorized as Pragma (1) is described. With the pragma specification of "#pragma _overlap_access_object a, b, c", it is explicitly indicated to the user that integer arrays a[32], b[32], and c[32] are accessed at similar timings. The layout set information setting unit 78 performs the above-described grouping processing (S2) according to this pragma specification. In other words, assuming that the arrays a[32], b[32], and c[32] form one set of objects, the layout set information setting unit 78 places them into 128-byte groups. When an integer variable is 4 bytes, each of the arrays a[32], b[32], and c[32] is 128 bytes. Thus, this set of objects is split into three groups shown in FIG. 9 (groups data_a, data_b, and data_c), where the array a[32] is included in the group data_a, the array b[32] is included in the group data_b, and the array c[32] is included in the group data_c.

After the grouping processing (S2), the layout set information setting unit 78 assigns different set numbers to the respective groups (S3 in FIG. 7). For example, set numbers 0, 1, and 2 are assigned to the groups data_a, data_b, and data_c, respectively.

Then, the layout set information setting unit 78 generates assembler codes that enable the objects of these groups to be laid out in corresponding blocks on the cache memory 3 whose set numbers are assigned in the group number setting processing (S3) (S4).

FIG. 10 is a diagram showing exemplary assembler codes generated from the source program shown in FIG. 8. The first three lines indicate that an object included in the group data_a is to be stored into a storage location on the main memory 2 that enables such object to be laid out in the zeroth set on the cache memory 3. The next three lines indicate that an object included in the group data_b is to be stored into a storage location on the main memory 2 that enables such object to be laid out in the first set on the cache memory 3. The last three lines indicate that an object included in the group data_c is to be stored into a storage location on the main memory 2 that enables such object to be laid out in the second set on the cache memory 3.

A description is given of the first three lines. The first line indicates that the command "SECTION" serves as the ending delimiter of a group and that the group name is "data_a". The second line indicates that an object described on the third line is to be stored into a storage location on the main memory 2 that enables such object to be laid out in the zeroth set on the cache memory 3. The third line indicates the object itself and that the data size of the object "a" (array "a") is 128 bytes. The same goes for the fourth line onward.

When the type of a pragma is categorized as Pragma (2) (_cache_set_number in S1), the pragma analyzing unit 74 places objects into groups according to the pragma specification (S5), and assigns set numbers to the respective groups (S6). For example, in the case of a source program as shown in FIG. 11 in which a pragma categorized as Pragma (2) is described, "0" is set for the array i[32] as a set number on the cache memory 3 according to the pragma specification "#pragma _cache_set_number=0 i". The same is applicable to "#pragma _cache_set_number=1 j" and "#pragma _cache_set_number=2 k".

Then, the layout set information setting unit 78 generates assembler codes that enable objects of these groups to be laid out in corresponding blocks on the cache memory 3 whose set numbers are assigned in the group number setting processing (S6) (S4).

When the type of the pragma is categorized as Pragma (3) (_cache_set_monopoly in S1), the layout set information setting unit 78 places the respective objects specified by the pragma into independent groups (S7). After that, the layout set information setting unit 78 assigns different set numbers to the respective groups (S8). For example, in the case of a source program as shown in FIG. 12 in which a pragma categorized as Pragma (3) is described, different set numbers on the cache memory 3 are assigned to the array x[32] and the array y[32] according to the pragma specification "#pragma cache_set_monopoly x, y".

Then, the layout set information setting unit 78 generates assembler codes that enable objects of the groups to be laid out in corresponding blocks on the cache memory 3 whose set numbers are assigned in the group number setting processing (S8) (S4). Note that when Pragma(3) is specified as the type of a pragma, such assembler codes are generated as enable objects specified by the pragma to monopolize the blocks corresponding to the set numbers on the cache memory 3 that are assigned in the group number setting processing (S7). Accordingly, it becomes possible for frequently-used objects to monopolize the cache memory 3, and therefore to prevent such objects from being flushed from the cache memory 3, as well as to achieve high-speed processing.

The above steps (S1 to S8) are executed for all pragmas (Loop A) to generate assembler codes. Note that it is also possible to set a pragma categorized as Pragma (2) "#pragma _cache_set_number" and a pragma categorized as Pragma (3) "#pragma _cache_set_monopoly" together for the same object.

<Linker Unit>

Figure 13:
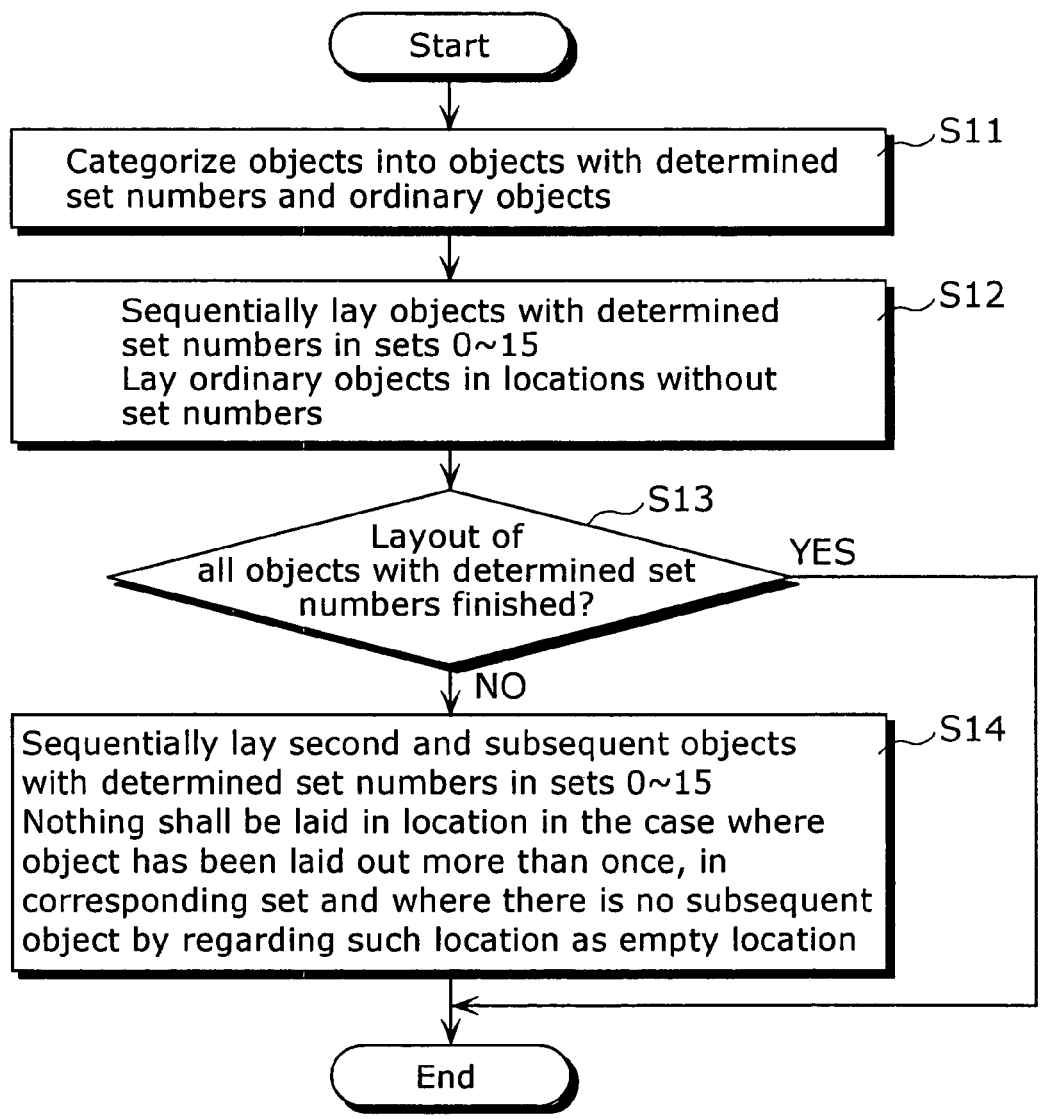
FIG. 13 is a flowchart showing processing performed by an address setting unit of a linker unit shown in FIG. 5.

FIG. 13 is a flowchart showing processing performed by the address setting unit 56 of the linker unit 54 shown in FIG.

Figure 14:
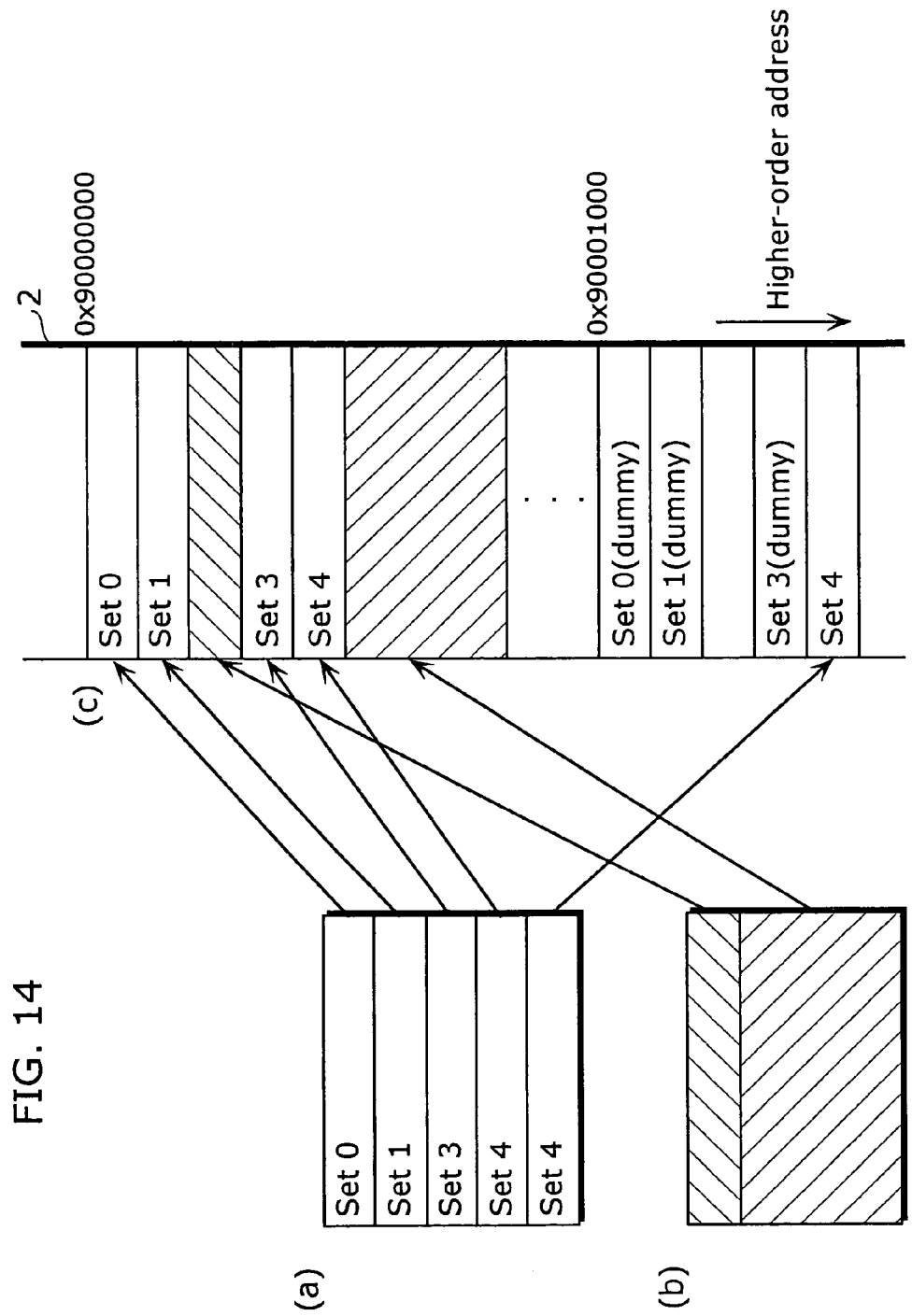
FIG. 14 is a diagram for explaining processing performed by the address setting unit of the linker unit shown in FIG. 5.

5. FIG. 14 is a diagram for explaining such processing. Referring to FIGS. 13 and 14, the following gives a description of processing performed by the address setting unit 56 of the linker unit 54.

The address setting unit 56 reads in more than one object file 52, and categorizes objects included in the more than one object file 52 into the following two types of objects (S11): objects whose set numbers on the cache memory 3 have already been determined; and objects whose set numbers on the cache memory 3 have not yet been determined. For example, the address setting unit 56 categorizes objects into ones as shown in (a) in FIG. 14 whose set numbers have already been determined and into ones as shown in (b) in FIG. 14 whose set numbers have not yet been determined.

Next, the address setting unit 56 determines the allocations of the respective objects on the main memory 2 (S12). More specifically, the address setting unit 56 allocates, on an object-by-object basis, the objects whose set numbers have already been determined into locations on the main memory 2 that enable such objects to be laid out on blocks with corresponding set numbers on the cache memory 3. Also, the address setting unit 56 allocates objects without set numbers into locations on the cache memory 3 that correspond to such set numbers which have not yet been set to any objects. At this point in time, as shown in (c) in FIG. 14, objects are stored in the locations on the main memory 2 at the addresses 0x900000000 to 0x90000FFF. As for two objects with the set number "4" in (a) in FIG. 14, only one of them is set.

Next, the address setting unit 56 checks whether or not all the objects for which set numbers have been determined are laid out on the main memory 2 (S13). If all of such objects have already been laid out on the main memory 2 (YES in S13), the address setting unit 56 terminates the processing. If any one of them has not yet been laid out on the main memory 2 (NO in S13), the address setting unit 56 lays out, on the main memory 2, such object and the subsequent objects, as in the case of the object layout processing (S12). In so doing, nothing shall be laid in a location corresponding to a set number which has been assigned to an object at least once, by regarding such location as an empty location (S14). Thus, as shown in (c) in FIG. 14, the other of the objects with the set number "4", which has not yet been laid out, is to be laid in the memory, and locations corresponding to the set numbers 0, 1, and 3 at the address of 0x90001000 onward are regarded as empty locations.

As described above, in the first embodiment, when an executable program is executed, objects which are considered by the user as being accessed at similar timings according to a pragma specification are laid in blocks with different set numbers on the cache memory 3. Accordingly, conflicts do not occur in which objects which are deemed as being accessed at similar timings contend for a block with the same set number on the cache memory and try to flush other objects. This makes it possible to cause fewer cache misses and therefore to increase the hit rate of the cache memory.

Second Embodiment

A partial hardware configuration of a target computer of the compiler system according to a second embodiment of the present invention is the same as the one shown in FIGS. 1 to 3. Also, the configuration of the compiler system according to the second embodiment is the same as the one shown in FIG. 5. Therefore, detailed descriptions thereof are not given here.

Figure 15:
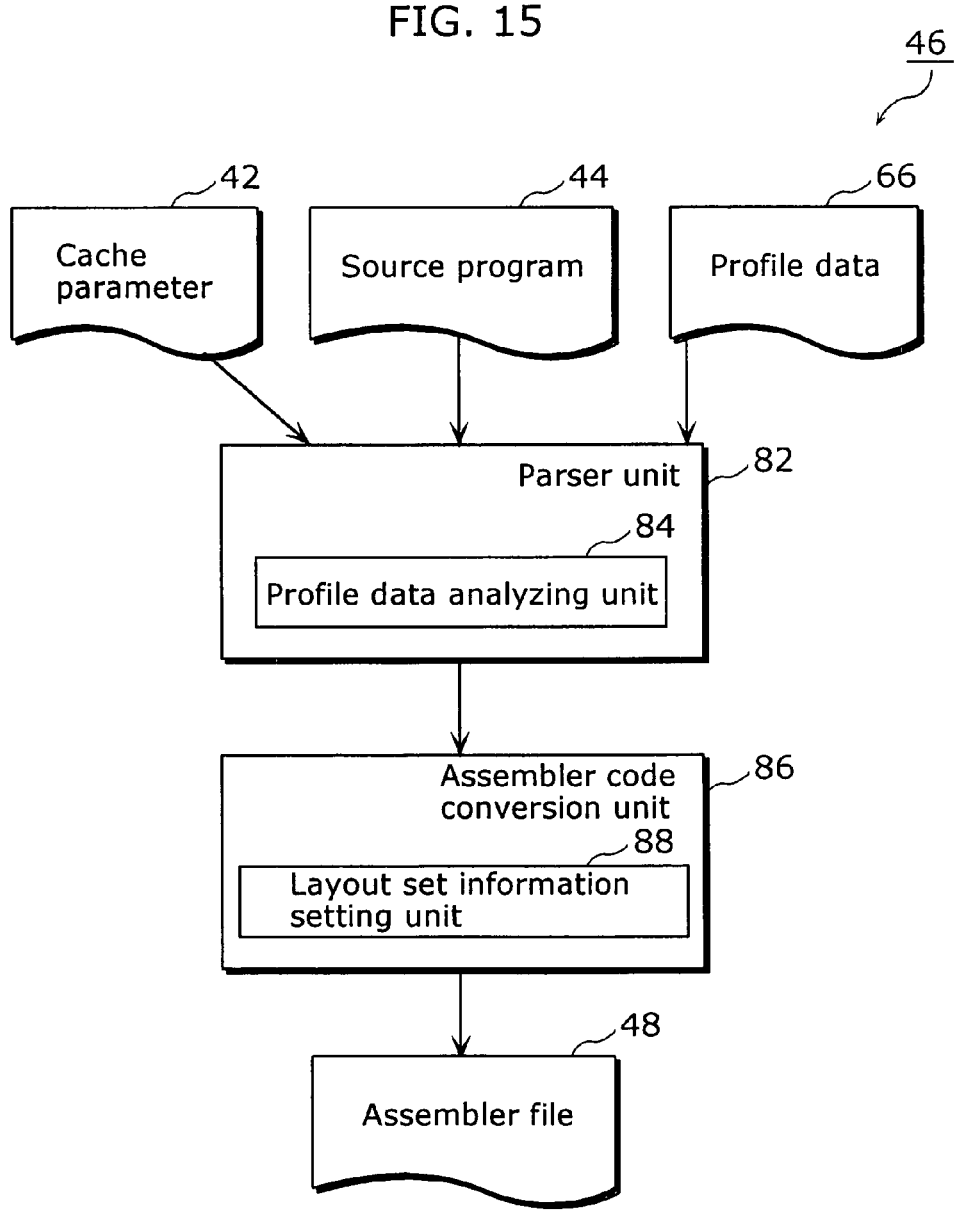
FIG. 15 is a functional block diagram showing a configuration of the compiler unit according to a second embodiment.

FIG. 15 is a functional block diagram showing a configuration of the compiler unit 46 according to the second embodiment. The compiler unit 46 of the second embodiment is a processing unit that converts the source program 44 into the assembler file 48 based on the cache parameter 42, the source program 44, and the profile data 66, and is comprised of a parser unit 82 and an assembler code conversion unit 86.

The parser unit 82 is a pre-processing unit that extracts a reserved word (keyword) and the like from the source program 44 to be compiled and performs lexical analysis of the extracted word, has a profile data analyzing unit 84 that analyzes the profile data 66, in addition to the analyzing functionality of ordinary compilers. The profile data 66 is information that serves as a hint for obtaining an optimum executable program 58, such as the access frequencies of objects (variables, and the like) and the lifetimes of objects, as described in the first embodiment.

The assembler code conversion unit 86 is a processing unit that converts each statement in the source program 44 passed from the parser unit 82 into an assembly language code after converting each statement into an intermediate code, and outputs the resultant as the assembler file 48. In addition to the conversion functionality of ordinary compilers, the assembler code conversion unit 86 is equipped with a layout set information setting unit 88 that generates an assembler code that enables an object to be laid out in a block with an appropriate set number, according to a result of analysis performed by the profile data analyzing unit 84.

Figure 16:
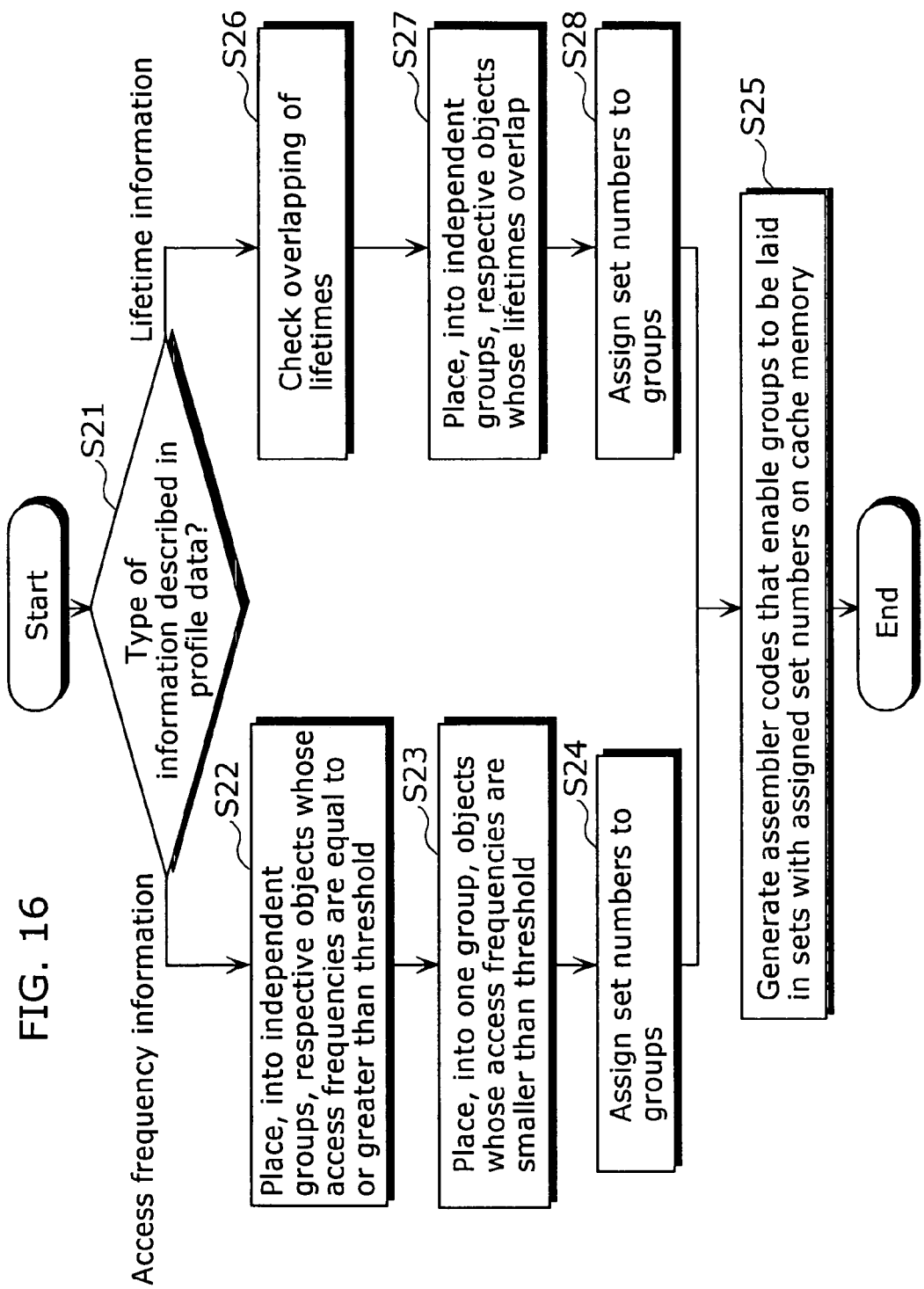
FIG. 16 is a flowchart showing processing performed by a profile data analyzing unit and a layout set information setting unit shown in FIG. 15.

FIG. 16 is a flowchart showing processing performed by the profile data analyzing unit 84 and the layout set information setting unit 88 shown in FIG. 15.

The profile data analyzing unit 84 analyzes the type of profile information described in the profile data 66 (S21). When such information described in the profile data 66 is related to the access frequencies of objects (Access frequency information in S21), the layout set information setting unit 88 places, into independent groups, the respective objects whose access frequencies are equal to or grater than a predetermined threshold (S22). Moreover, the layout set information setting unit 88 places, into one group, objects whose access frequencies are smaller than such predetermined threshold (S23). Next, the layout set information setting unit 88 sets different set numbers on the cache memory 3 to the respective groups grouped by the grouping processing (S22 and S23) (S24). Then, the layout set information setting unit 88 generates assembler codes for storing the objects in the above groups into locations on the main memory 2 that enable such objects to be laid in the corresponding blocks with set numbers on the cache memory 3 that are assigned in the group number setting processing (S24) (S25).

Figure 17:
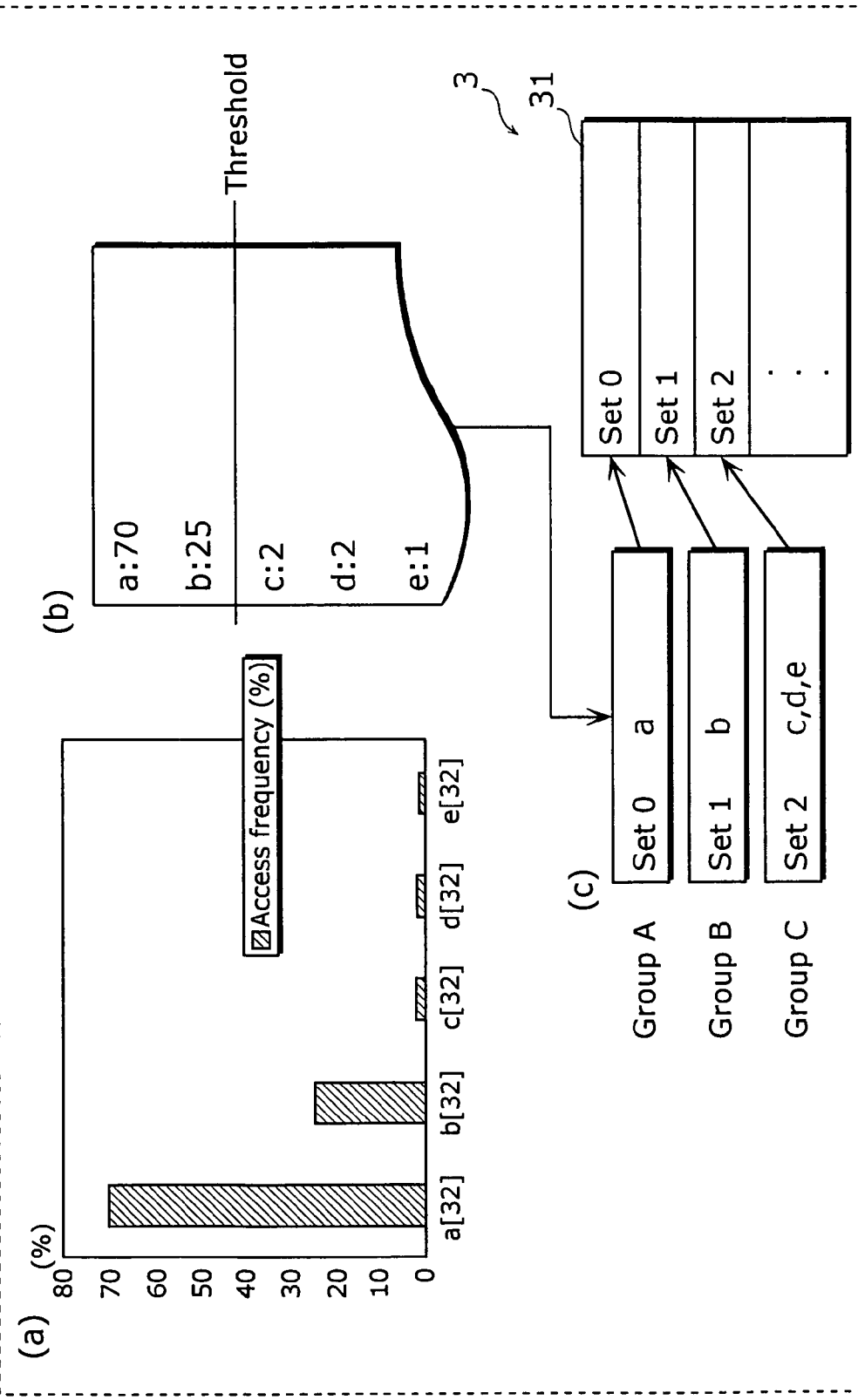
FIG. 17 is a diagram for explaining assembler code generation processing to be performed on the basis of access frequency information.

Next, providing a concrete example, more detailed descriptions are given of the assembler code generation processing (S22 to S25) that is performed on the basis of access frequency information. FIG. 17 is a diagram for explaining assembler code generation processing to be performed on the basis of access frequency information. Suppose that profile information that includes access frequencies as shown in (a) in FIG. 17 is provided now. Here, used as an access frequency is the ratio of the number of accesses to each object with respect to the number of accesses to all the objects, but the total number of accesses and the number of accesses per unit time, for example, may also be used as access frequency. (b) in FIG. 17 shows a result of converting, into numeric values, the graph of (a) in FIG. 17. In (b) in FIG. 17, objects "a" to "e" (arrays a[32] to e[32]) have the access frequencies of 70%, 25%, 2%, 2%, and 1%, respectively.

Here, assuming that a threshold is set to 10%, for example, the objects "a" and "b" whose access frequencies are not smaller than 10%, as shown in (c) in FIG. 17, are placed into groups A and B, respectively (S22 in FIG. 16). Whereas, objects "c" to "e" whose access frequencies are less than 10% are placed into one group, group C (S23 in FIG. 16). Moreover, set numbers 0 to 2 are set to the groups A to C, respectively (S24 in FIG. 16). At the end, assembler codes are generated for storing the objects "a" to "e" into locations on the main memory 2 that enable the object "a" to be stored in the block with the set number 0 on the cache memory 3, the object "b" to be stored in the block with the set number 1 on the cache memory 3, and the objects "c" to "e" to be stored in the block with the set number 2 on the cache memory 3 (S25 in FIG. 16).

If information described in the profile data 66 is related to lifetimes of objects (Lifetime information in S21), the layout set information setting unit 88 checks how the lifetimes of the respective objects overlap (S26). Then, the layout set information setting unit 88 groups the objects in a way that enables objects with the overlapping lifetimes to be placed into different groups (S27). After that, the layout set information setting unit 88 sets different set numbers on the cache memory 3 to the groups that are grouped in the grouping processing (S26 and S27) (S28). Subsequently, the layout set information setting unit 88 carries out the above-described assembler code generation processing (S25).

Next, providing a concrete example, more detailed descriptions are given of the assembler code generation processing (S26 to S28, and S25) that is performed on the basis of lifetime information. FIG. 18 is a diagram showing an example of the profile data 66 related to lifetimes. The lifetimes related to five objects "a" to "e" are shown in FIG. 18. In this drawing, the first line depicts the lifetime of the object "a", where data indicating the start time of its lifetime is "0x80000010" and data indicating the end time of its lifetime is "0x800001ff". The same is applicable to the second line onward.

Figure 19:
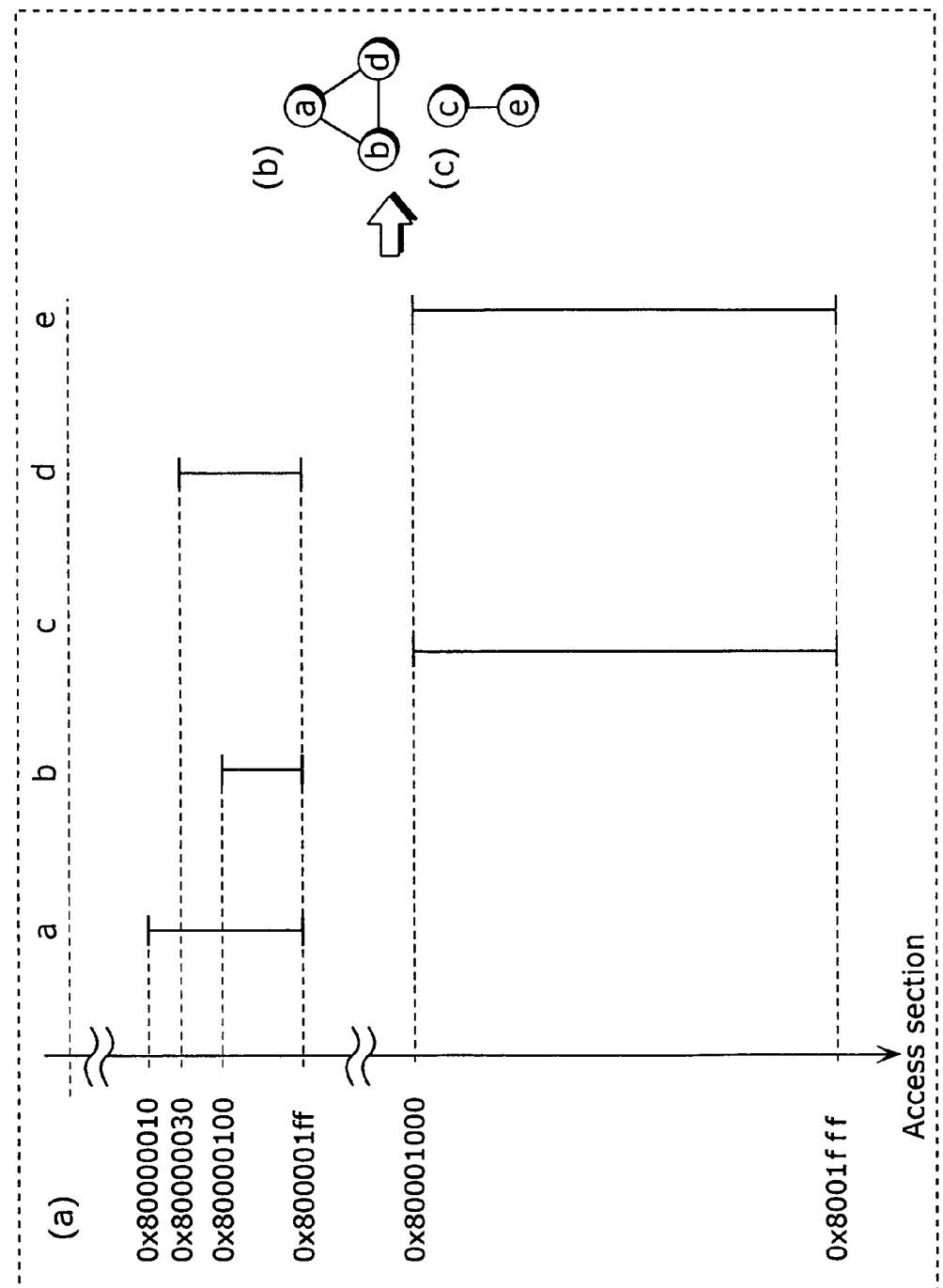
FIG. 19 shows graphs representing the lifetimes of the objects.

(a) in FIG. 19 is an illustration of such lifetime-related information. (b) and (c) in FIG. 19 show the results of representing overlapping lifetimes by non-directed graphs, in which each object serves as a nodal point and each overlapping lifetime is depicted as a branch. This drawing indicates that the objects "a", "b", and "d" overlap with one another, and the objects "c" and "e" overlap with each other (S26 in FIG. 16).

Figure 20:
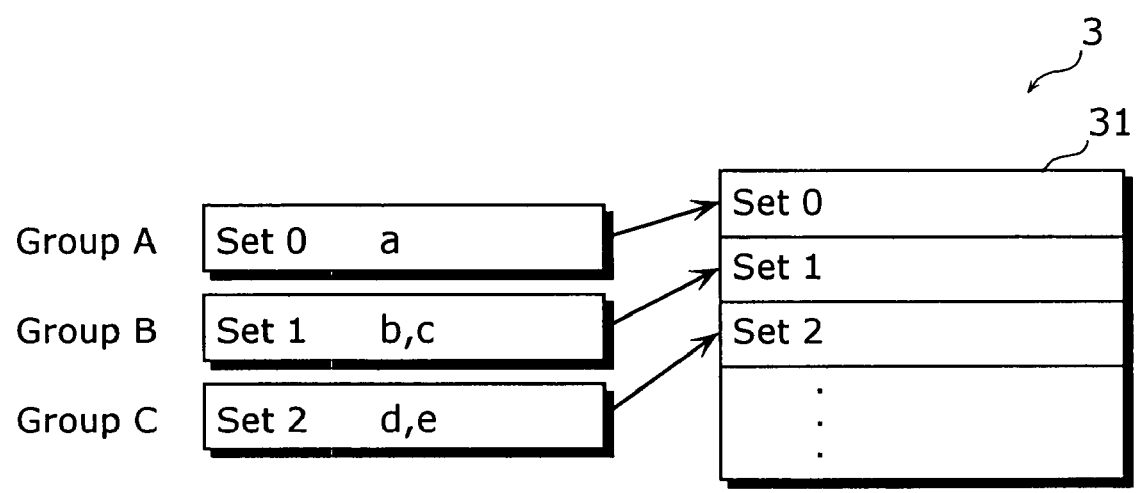
FIG. 20 is a diagram showing a result of placing objects into groups.

If the lifetimes overlap with one another as above, the objects are grouped as shown in FIG. 20 (S27 in FIG. 16). More specifically, the objects "a", "b", and "d" whose lifetimes overlap are placed into different groups A, B, and C, respectively. Similarly, the objects "c" and "e" are placed into different groups B and C, respectively. Furthermore, set numbers 0 to 2 are assigned to the groups A to C, respectively (S24 in FIG. 16). At the end, assembler codes are generated for storing the objects "a" to "e" into locations on the main memory 2 that enable the object "a" to be stored in the block with the set number 0 on the cache memory 3, the objects "b" and "c" to be stored in the block with the set number 1 on the cache memory 3, and the objects "d" and "e" to be stored in the block with the set number 2 on the cache memory 3 (S25 in FIG. 16). Note that the objects "b" and "c" are placed into the same group, and the objects "d" and "e" are placed in to the same group, but they may be placed into mutually different groups.

As described above, according to the second embodiment, objects with high access frequencies are laid in blocks with different set numbers on the cache memory, when the executable program is executed. Furthermore, objects with low access frequencies are laid in a block with another set number that is different from the above set numbers. This makes it possible for objects with high access frequencies to monopolize blocks on the cache memory. Accordingly, by making it difficult for frequently-used objects to be flushed from the cache memory, it becomes possible to prevent cache misses and to increase the hit rate of the cache memory.

Furthermore, objects whose lifetimes overlap with one another are laid in blocks with different set numbers. Accordingly, there does not occur any conflicts in which objects which are accessed at the same timing contend for a block with the same set number and try to flush other objects. This makes it possible to cause fewer cache misses and therefore to increase the hit rate of the cache memory.

Third Embodiment

A partial hardware configuration of a target computer of the compiler system according to the third embodiment of the present invention is the same as the one shown in FIGS. 1 to 3. Also, the configuration of the compiler system according to the third embodiment is the same as the one shown in FIG. 5. Therefore, detailed descriptions thereof are not given here.

Figure 22:
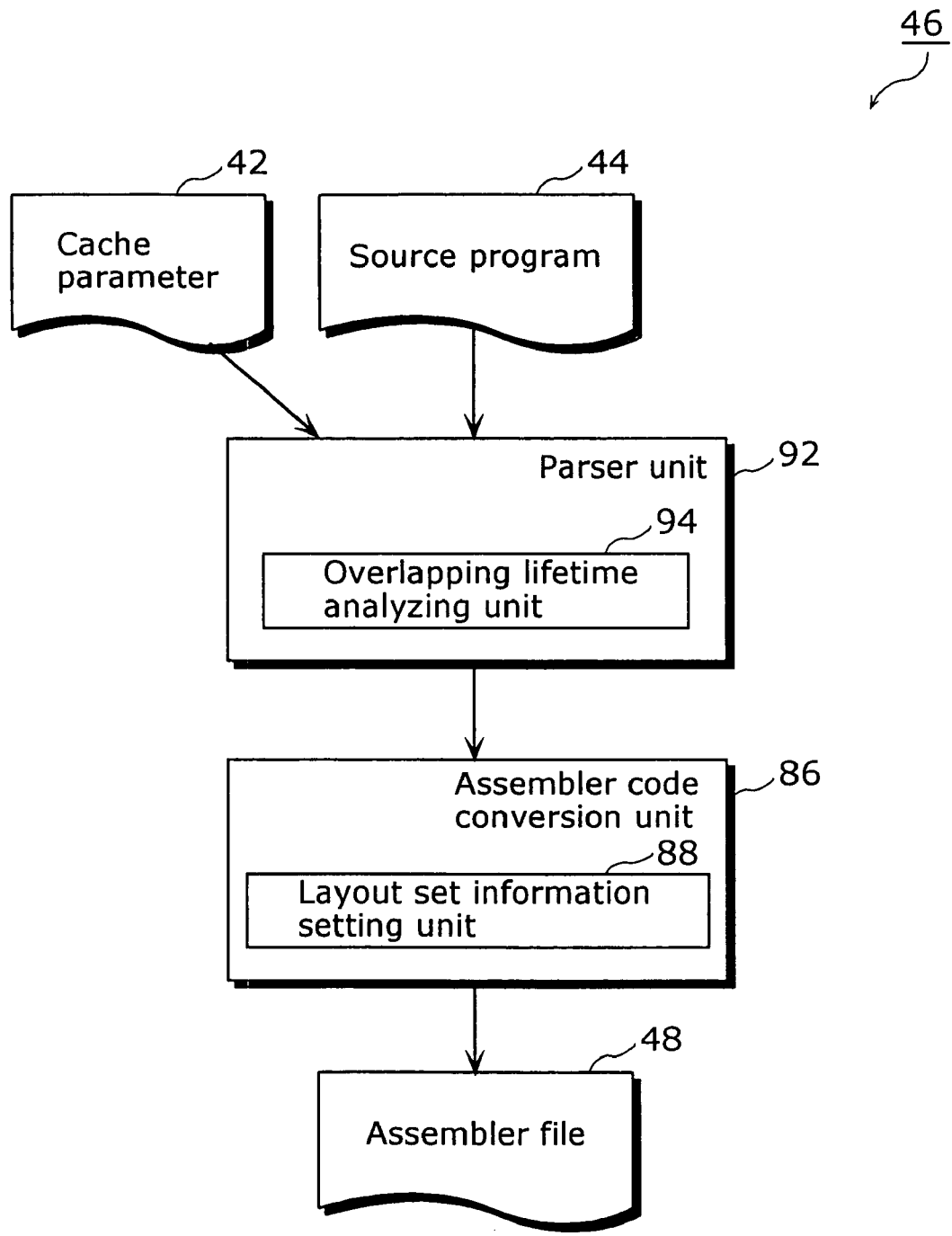
FIG. 22 is a functional block diagram showing a configuration of the compiler unit according to a third embodiment.

FIG. 22 is a functional block diagram showing a configuration of the compiler unit 46 according to the third embodiment. The compiler unit 46 of the third embodiment is a processing unit that converts the source program 44 into the assembler file 48 based on the cache parameter 42 and the source program 44, and is comprised of a parser unit 92 and the assembler code conversion unit 86.

The parser unit 92 is a pre-processing unit that extracts a reserved word (keyword) and the like from the source program 44 to be compiled and performs lexical analysis of the extracted word, has an overlapping lifetime analyzing unit 94 that analyzes an overlapping of the lifetimes of objects (variables, and the like), in addition to the analyzing functionality of ordinary compilers.

Figure 23:
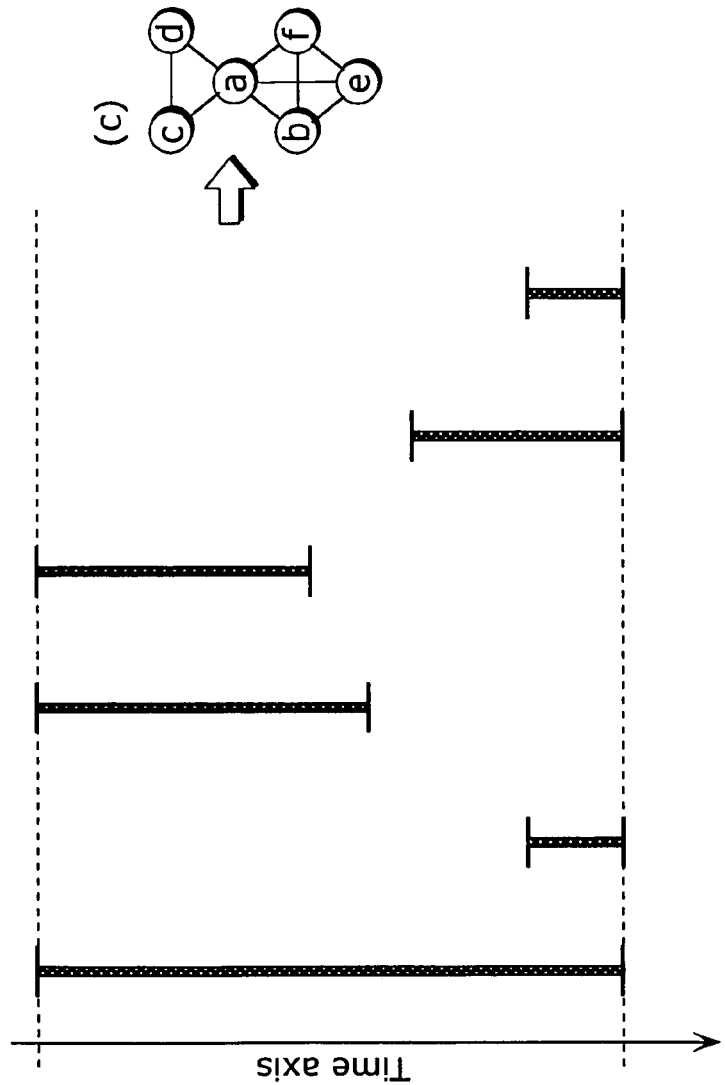
FIG. 23 is a diagram for explaining overlapping of lifetimes of objects.
Figure 24:
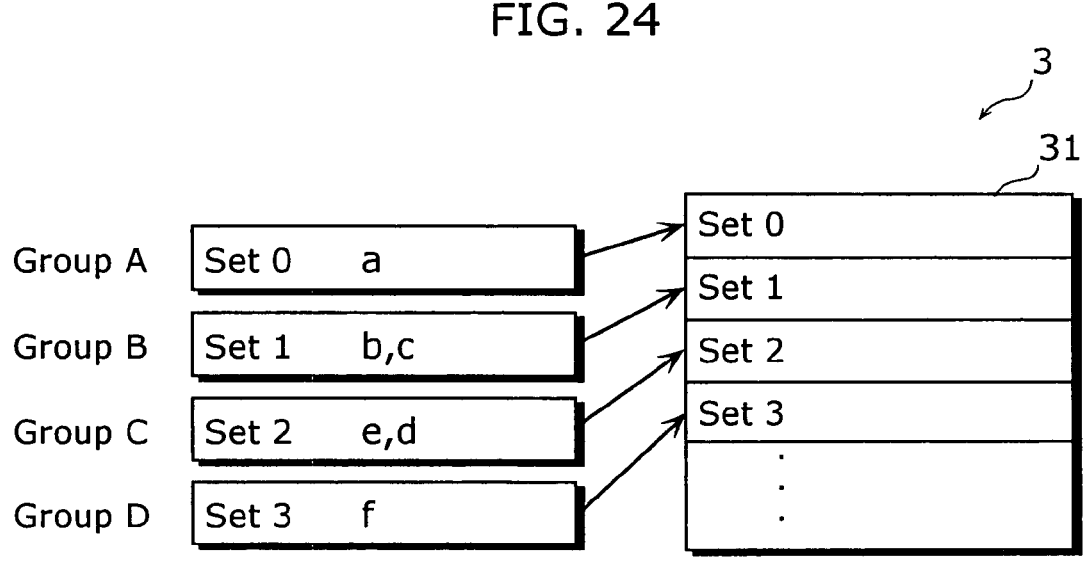
FIG. 24 is a diagram for explaining a result of performing grouping of objects as well as setting of set numbers on the cache memory.

The overlapping lifetime analyzing unit 94 analyzes the source program 44 to analyze an overlapping of the lifetimes of objects. For example, in the case where the source program 44 as shown in (a) in FIG. 23 is provided now, a graph shown in (b) in FIG. 23 is generated as a result of analyzing the lifetimes of the objects "a" to "f". (c) in FIG. 23 is a result of representing, on the basis of the graph shown in (b) in FIG. 23, overlapping lifetimes by non-directed graphs, in which each object serves as a nodal point and each overlapping lifetime is depicted as a branch. This drawing indicates that the objects "a", "b", "e" and "f" overlap with one another, and the objects "a", "c" and "d" overlap with one another. By performing the processing equivalent to that of the second embodiment based on the above information related to the overlapping of the lifetimes of the objects, the grouping of the objects as well as the setting of set numbers on the cache memory 3 are performed as shown in FIG. 24. At the end, assembler codes as shown in FIG. 25 are generated.

As described above, according to the third embodiment, objects whose lifetimes overlap are laid in blocks with different set numbers. Accordingly, there does not occur any conflicts in which objects which are accessed at the same timing contend for a block with the same set number and try to flush other objects. This makes it possible to cause fewer cache misses and therefore to increase the hit rate of the cache memory.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

For example, a cache memory using an "n"-way set associative scheme may be used as a cache memory. The present invention is applicable to a compiler, and more particularly to a compiler, and the like that targets at a computer having a cache memory.

What is claimed is:

1. A compilation method for converting a source program into an object program for use with a computer having a data cache memory and a main memory, wherein the data cache memory comprises a plurality of blocks and each of the plurality of blocks of the data cache memory, specified by a set number, is a storage unit, and wherein the main memory comprises a plurality of blocks, each of the plurality of blocks of the main memory having a set number representing a block of the plurality of blocks of the data cache memory, wherein said compilation method comprises:

a grouping step of analyzing grouping information that is used for grouping data objects included in the source program, and placing each of the data objects to which accesses are made at similar timings into a respective different group based on a result of the analysis; and an object program generation step of generating the object program based on a result of the grouping performed in said grouping step, the object program not allowing data objects belonging to different groups to be statically laid out in any blocks of the plurality of blocks of the main memory having a same set number on the data cache memory, and wherein in said grouping step, a directive to the compiler apparatus included in the source program is analyzed, and the data objects included in the source program are placed into the different groups based on a result of the analysis of the directive.

2. The compilation method according to claim 1, wherein the directive is a pragma command for placing a set of one or more data objects specified in the pragma command into one or more groups on a line size basis of the data cache memory, and in said grouping step, the specified set of one or more data objects is placed into the one or more groups on the line size basis of the data cache memory, based on the pragma command included in the source program.

3. The compilation method according to claim 1, wherein the directive is a pragma command for laying out a specified data object in a block of the plurality of blocks of the main memory having a specified set number on the data cache memory, the specified data object and the specified set number being indicated in the pragma command, in said grouping step, the specified data object is placed into a group by associating the specified data object with the specified set number, based on the pragma command included in the source program, and in said object program generation step, the object program generated allows the data object belonging to the group to be laid out in the block of the plurality of blocks of the main memory having the specified set number on the data cache memory.

4. The compilation method according to claim 1, wherein the directive is a pragma command that allows data objects specified in the pragma command to be laid out in blocks of the plurality of blocks of the main memory having mutually different set numbers and that allows the specified data objects to make exclusive use of respective blocks of the plurality of blocks of the main memory, said grouping step further comprises:

a grouping processing sub-step of placing the specified data objects into groups on a data object basis, based on the pragma command included in the source program; and a set number setting sub-step of setting different set numbers to respective groups, and in said object program generation step, the object program generated allows the specified data objects belonging to the respective groups to be laid out in the blocks of the plurality of blocks of the main memory having the set numbers on the data cache memory corresponding to the respective groups and allows the specified data objects to make exclusive use of the respective blocks of the plurality of blocks of the main memory.

5. A compilation method for converting a source program into an object program for use with a computer having a data cache memory and a main memory, wherein the data cache memory comprises a plurality of blocks and each of the plurality of blocks of the data cache memory specified by a set number, is a storage unit, and wherein the main memory comprises a plurality of blocks, each of the plurality of blocks of the main memory having a set number representing a block of the plurality of blocks of the data cache memory, wherein said compilation method comprises:

a grouping step of analyzing grouping information that is used for grouping data objects included in the source program, and placing each of the data objects to which accesses are made at similar timings into a respective different group based on a result of the analysis; and an object program generation step of generating the object program based on a result of the grouping performed in said grouping step, the object program not allowing data objects belonging to different groups to be statically laid out in any blocks of the plurality of blocks of the main memory having a same set number on the data cache memory, and wherein in said grouping step, profile information that is generated when a machine language instruction sequence generated from the source program is executed is analyzed, and the data objects included in the source program are placed into the different groups based on a result of the analysis of the profile information.

6. The compilation method according to claim 5, wherein the profile information includes information related to access frequencies of respective data objects, and in said grouping step, data objects whose access frequencies are equal to or greater than a predetermined threshold are placed into mutually different groups.

7. The compilation method according to claim 5, wherein the profile information includes information related to lifetimes of respective data objects, and in said grouping step, data objects whose lifetimes overlap are placed into mutually different groups.

8. A compiler apparatus stored in a computer-readable recording medium the compiler apparatus for converting a source program into an object program for use with a computer having a data cache memory and a main memory, wherein the data cache memory comprises a plurality of blocks, each of the plurality of blocks of the data cache memory being represented by a set number and being a storage unit, wherein the main memory comprises a plurality of blocks, each of the plurality of blocks of the main memory having a set number representing a block of the plurality of blocks of the data cache memory, wherein said compiler apparatus comprises:

a grouping unit operable to analyze grouping information that is used for grouping data objects included in the source program, and place each of the data objects to which accesses are made at similar timings into a respective different group based on a result of the analysis; and an object program generation unit operable to generate the object program based on a result of the grouping performed by said grouping unit the object program not allowing data objects belonging to different groups to be statically laid out in any blocks of the plurality of blocks of the main memory having a same set number on the data cache memory, and wherein said grouping unit analyzes a directive to the compiler apparatus included in the source program, and places the data objects included in the source program into the different groups based on a result of the analysis of the directive.

9. The compiler apparatus according to claim 8, wherein the directive is a pragma command for placing a set of one or more data objects specified in the pragma command into one or more groups on a line size basis of the data cache memory, and said grouping unit places the specified set of one or more data objects into the one or more groups on the line size basis of the data cache memory, based on the pragma command included in the source program.

10. The compiler apparatus according to claim 8, wherein the directive is a pragma command for laying out a specified data object in a block of the plurality of blocks of the main memory having a specified set number on the data cache memory, the specified data object and the specified set number being indicated in the pragma command, said grouping unit places the specified data object into a group by associating the specified data object with the specified set number, based on the pragma command included in the source program, and said object program generation unit generates the object program to allow the data object belonging to the group to be laid out in the block of the plurality of blocks of the main memory having the specified set number on the data cache memory.

11. The compiler apparatus according to claim 8, wherein the directive is a pragma command that allows data objects specified in the pragma command to be laid out in blocks of the plurality of blocks of the main memory having mutually different set numbers and that allows the specified data objects to make exclusive use of respective blocks of the plurality of blocks of the main memory, said grouping unit includes:

a grouping processing unit operable to place the specified data objects into groups on a data object basis, based on the pragma command included in the source program; and a set number setting unit operable to set different set numbers to respective groups, and said object program generation unit generates the object program to allow the specified data objects belonging to the respective groups to be laid out in the blocks of the plurality of blocks of the main memory having the set numbers on the data cache memory corresponding to the respective groups and to allow the specified data objects to make exclusive use of the respective blocks of the plurality of blocks of the main memory.

12. A compiler apparatus stored in a computer-readable recording medium the compiler apparatus for converting a source program into an object program for use with a computer having a data cache memory and a main memory, wherein the data cache memory comprises a plurality of blocks, each of the plurality of blocks of the data cache memory being represented by a set number and being a storage unit, wherein the main memory comprises a plurality of blocks, each of the plurality of blocks of the main memory having a set number representing a block of the plurality of blocks of the data cache memory, wherein said compiler apparatus comprises:

a grouping unit operable to analyze grouping information that is used for grouping data objects included in the source program, and place each of the data objects to which accesses are made at similar timings into a respective different group based on a result of the analysis; and an object program generation unit operable to generate the object program based on a result of the grouping performed by said grouping unit, the object program not allowing data objects belonging to different groups to be statically laid out in any blocks of the plurality of blocks of the main memory having a same set number on the data cache memory, and wherein said grouping unit is further operable to analyze profile information that is generated when a machine language instruction sequence generated from the source program is executed, and to place the data objects included in the source program into the different groups based on a result of the analysis of the profile information.

13. The compiler apparatus according to claim 12, wherein the profile information includes information related to access frequencies of respective data objects, and said grouping unit places, into mutually different groups, data objects whose access frequencies are equal to or greater than a predetermined threshold.

14. The compiler apparatus according to claim 12, wherein the profile information includes information related to lifetimes of respective data objects, and said grouping unit places, into mutually different groups, data objects whose lifetimes overlap.

15. A compiler apparatus stored in a computer-readable recording medium the compiler apparatus for converting a source program into an object program for use with a computer having a data cache memory and a main memory, wherein the data cache memory comprises a plurality of blocks, each of the plurality of blocks of the data cache memory being represented by a set number and being a storage unit, wherein the main memory comprises a plurality of blocks, each of the plurality of blocks of the main memory having a set number representing a block of the plurality of blocks of the data cache memory, wherein said compiler apparatus comprises:
    a grouping unit operable to analyze grouping information that is used for grouping data objects included in the source program, and place each of the data objects to which accesses are made at similar timings into a respective different group based on a result of the analysis; and
    an object program generation unit operable to generate the object program based on a result of the grouping performed by said grouping unit, the object program not allowing data objects belonging to different groups to be statically laid out in any blocks of the plurality of blocks of the main memory having a same set number on the data cache memory, and
    wherein said grouping unit is further operable to analyze an overlapping of lifetimes of the data objects included in the source program based on the source program, and to place, into mutually different groups, data objects whose lifetimes overlap.

16. A compilation method for converting a source program into an object program for use with a computer having a data cache memory and a main memory,
    wherein the data cache memory comprises a plurality of blocks and each of the plurality of blocks of the data cache memory, specified by a set number is a storage unit, and
    wherein the main memory comprises a plurality of blocks, each of the plurality of blocks of the main memory having a set number representing a block of the plurality of blocks of the data cache memory,
    wherein said compilation method comprises:
        a grouping step of analyzing grouping information that is used for grouping data objects included in the source program, and placing each of the data objects to which accesses are made at similar timings into a respective different group based on a result of the analysis; and
        an object program generation step of generating the object program based on a result of the grouping performed in said grouping step, the object program not allowing data objects belonging to different groups to be statically laid out in any blocks of the plurality of blocks of the main memory having a same set number on the data cache memory, and
    wherein in said grouping step, an overlapping of lifetimes of the data objects included in the source program is analyzed based on the source program, and data objects whose lifetimes overlap are placed into mutually different groups.

17. A link method for linking one or more object programs generated by use of a compilation method and generating an executable program,
    wherein the compilation method is for converting a source program into an object program for use with a computer having a data cache memory and a main memory,
    wherein the data cache memory comprises a plurality of blocks and each of the plurality of blocks of the data cache memory, specified by a set number, is a storage unit,
    wherein the main memory comprises a plurality of blocks, each of the plurality of blocks of the main memory having a set number representing a block of the plurality of blocks of the data cache memory,
    wherein the compilation method comprises:
        analyzing grouping information that is used for grouping data objects included in the source program, and placing each of the data objects to which accesses are made at similar timings into a respective different group based on a result of the analyzing; and
        generating the object program based on a result of the grouping performed in the analyzing, the object program not allowing data objects belonging to different groups to be statically laid out in any blocks of the plurality of blocks of the main memory having a same set number on the data cache memory,
    wherein said link method comprises:
        setting an address of a first block of the plurality of blocks of the main memory for a data object whose set number has been determined, the first block being where the data object is to be laid out in the main memory, and the first block having the determined set number; and
        setting an address of a second block of the plurality of blocks of the main memory for a data object whose set number has not been determined, the second block being where the data object whose set number has not been determined is to be laid out in the main memory, and the second block having a set number other than the determined set number of the first block and
    wherein the analyzing includes analyzing a directive to the compiler apparatus included in the source program, and placing the data objects included in the source program into the different groups based on a result of the analysis of the directive.

18. A compiler stored in a computer-readable recording medium operable to communicate with a computer having a data cache memory and a main memory, and operable to convert a source program into an object program,
    wherein the data cache memory comprises a plurality of blocks and each of the plurality of blocks of the data cache memory, specified by a set number, is a storage unit, and
    wherein the main memory comprises a plurality of blocks, each of the plurality of blocks of the main memory having a set number representing a block of the plurality of blocks of the data cache memory,
    wherein the compiler is operable to cause the computer to execute:
        analyzing grouping information that is used for grouping data objects included in the source program, and placing each of the data objects to which accesses are made at similar timings into a respective different group based on a result of said analyzing; and
        generating the object program based on a result of the grouping performed in said analyzing, the object program not allowing data objects belonging to different groups to be statically laid out in any blocks of the plurality of blocks of the main memory having a same set number on the data cache memory, and
    wherein said analyzing includes analyzing a directive to the compiler apparatus included in the source program, and placing the data objects included in the source program into the different groups based on a result of the analysis of the directive.

19. A link program stored in a computer-readable recording medium operable to link one or more object programs generated by use of a compiler and operable to generate an executable program,
    wherein the compiler is operable to convert a source program into an object program for use with a computer having a data cache memory and a main memory, wherein the data cache memory comprises a plurality of blocks and each of the plurality of blocks of the data cache memory, specified by a set number, is a storage unit, wherein the main memory comprises a plurality of blocks, each of the plurality of blocks of the main memory having a set number representing a block of the plurality of blocks of the data cache memory, wherein the compiler is operable to cause the computer to execute:

analyzing grouping information that is used for grouping data objects included in the source program, and placing each of the data objects to which accesses are made at similar timings into a respective different group based on a result of the analyzing; and generating the object program based on a result of the grouping performed in the analyzing, the object program not allowing data objects belonging to different groups to be statically laid out in any blocks of the plurality of blocks of the main memory having a same set number on the data cache memory, wherein said link program is operable to cause the computer to execute:

setting an address of a first block of the plurality of blocks of the main memory for a data object whose set number has been determined, the first block being where the data object is to be laid out in the main memory, and the first block having the determined set number; and setting an address of a second block of the plurality of blocks of the main memory for a data object whose set number has not been determined, the second block being where the data object whose set number has not been determined is to be laid out in the main memory, and the second block having a set number other than the determined set number of the first block, and wherein the analyzing includes analyzing a directive to the compiler apparatus included in the source program, and placing the data objects included in the source program into the different groups based on a result of the analysis of the directive.

20. A computer-readable recording medium on which a compiler is stored, said compiler being operable to communicate with a computer having a data cache memory and a main memory, and being operable to convert a source program into an object program, wherein the data cache memory comprises a plurality of blocks and each of the plurality of blocks of the data cache memory, specified by a set number, is a storage unit, wherein the main memory comprises a plurality of blocks, each of the plurality of blocks of the main memory having a set number representing a block of the plurality of blocks of the data cache memory, wherein the compiler is operable to cause the computer to execute:

analyzing grouping information that is used for grouping data objects included in the source program, and placing each of the data objects to which accesses are made at similar timings into a respective different group based on a result of said analyzing; and generating the object program based on a result of the grouping performed in said analyzing, the object program not allowing data objects belonging to different groups to be statically laid out in any blocks of the plurality of blocks of the main memory having a same set number on the data cache memory, and wherein said analyzing includes analyzing a directive to the compiler apparatus included in the source program, and placing the data objects included in the source program into the different groups based on a result of the analysis of the directive.

21. A computer-readable recording medium on which a link program is stored, said link program being operable to link one or more object programs generated by use of a compiler and being operable to generate an executable program, wherein the compiler is operable to convert a source program into an object program for use with a computer having a data cache memory and a main memory, wherein the data cache memory comprises a plurality of blocks and each of the plurality of blocks of the data cache memory, specified by a set number, is a storage unit, wherein the main memory comprises a plurality of blocks, each of the plurality of blocks of the main memory having a set number corresponding to a block of the plurality of blocks of the data cache memory, wherein the compiler is operable to cause the computer to execute:

analyzing grouping information that is used for grouping data objects included in the source program, and placing each of the data objects to which accesses are made at similar timings into a respective different group based on a result of the analyzing; and generating the object program based on a result of the grouping performed in the analyzing, the object program not allowing data objects belonging to different groups to be statically laid out in any blocks of the plurality of blocks of the main memory having a same set number on the data cache memory, wherein said link program is operable to cause the computer to execute:

setting an address of a first block of the plurality of blocks of the main memory for a data object whose set number has been determined, the first block being where the data object is to be laid out in the main memory, and the first block having the determined set number; and setting an address of a second block of the plurality of blocks of the main memory for a data object whose set number has not been determined, the second block being where the data object whose set number has not been determined is to be laid out in the main memory, and the second block having a set number other than the determined set number of the first block and wherein the analyzing includes analyzing a directive to the compiler apparatus included in the source program, and placing the data objects included in the source program into the different groups based on a result of the analysis of the directive.

22. A compiler apparatus stored in a computer-readable recording medium, the compiler apparatus for converting a source program into an object program for use with a computer having a data cache memory and a main memory, wherein the data cache memory comprises a plurality of blocks, each of the plurality of blocks of the data cache memory being represented by a set number and being a storage unit, wherein the main memory comprises a plurality of blocks, each of the plurality of blocks of the main memory having a set number representing a block of the plurality of blocks of the data cache memory, wherein said compiler apparatus comprises:
a grouping unit operable to analyze grouping information that is used for grouping data objects included in the source program, and place each of the data objects to which accesses are made at similar timings into a respective different group based on a result of the analysis; and
an object program generation unit operable to generate the object program based on a result of the grouping performed by said grouping unit, the object program not allowing data objects belonging to different groups to be statically laid out in any blocks of the plurality of blocks of the main memory having a same set number on the data cache memory, and
wherein a total size of the data objects belonging to each of the different groups is less than or equal to a storage size of one block of the plurality of blocks of the data cache memory.

23. A linker apparatus stored in a computer-readable recording medium, the linker apparatus for causing a computer to link one or more object programs generated by use of a compiler apparatus and generate an executable program,
wherein the compiler apparatus is operable to convert a source program into an object program for use with a computer having a data cache memory and a main memory,
wherein the data cache memory comprises a plurality of blocks, each of the plurality of blocks of the data cache memory being represented by a set number and being a storage unit,
wherein the main memory comprises a plurality of blocks, each of the plurality of blocks of the main memory having a set number representing a block of the plurality of blocks of the data cache memory,
wherein the compiler apparatus includes:
a grouping unit operable to analyze grouping information that is used for grouping data objects included in the source program, and place each of the data objects to which accesses are made at similar timings into a respective different group based on a result of the analysis; and
an object program generation unit operable to generate the object program based on a result of the grouping performed by the grouping unit, the object program not allowing data objects belonging to different groups to be statically laid out in any blocks of the plurality of blocks of the main memory having a same set number on the data cache memory,
wherein the linker apparatus comprises:
a first address setting unit operable to set an address of a first block of the plurality of blocks of the main memory for a data object whose set number has been determined, the first block being where the data object is to be laid out in the main memory, and the first block having the determined set number; and
a second address setting unit operable to set an address of a second block of the plurality of blocks of the main memory for a data object whose set number has not been determined, the second block being where the data object whose set number has not been determined is to be laid out in the main memory, and the second block having a set number other than the determined set number of the first block, and
wherein the grouping unit analyzes a directive to the compiler apparatus included in the source program, and places the data objects included in the source program into the different groups based on a result of the analysis of the directive.

24. A linker apparatus stored in a computer-readable recording medium, the linker apparatus for causing a computer to link one or more object programs generated by use of a compiler apparatus and generate an executable program,
wherein the compiler apparatus is operable to convert a source program into an object program for use with a computer having a data cache memory and a main memory,
wherein the data cache memory comprises a plurality of blocks, each of the plurality of blocks of the data cache memory being represented by a set number and being a storage unit,
wherein the main memory comprises a plurality of blocks, each of the plurality of blocks of the main memory having a set number representing a block of the plurality of blocks of the data cache memory,
wherein the compiler apparatus includes:
a grouping unit operable to analyze grouping information that is used for grouping data objects included in the source program, and place each of the data objects to which accesses are made at similar timings into a respective different group based on a result of the analysis; and
an object program generation unit operable to generate the object program based on a result of the grouping performed by the grouping unit, the object program not allowing data objects belonging to different groups to be statically laid out in any blocks of the plurality of blocks of the main memory having a same set number on the data cache memory,
wherein the linker apparatus comprises:
a first address setting unit operable to set an address of a first block of the plurality of blocks of the main memory for a data object whose set number has been determined, the first block being where the data object is to be laid out in the main memory, and the first block having the determined set number; and
a second address setting unit operable to set an address of a second block of the plurality of blocks of the main memory for a data object whose set number has not been determined, the second block being where the data object whose set number has not been determined is to be laid out in the main memory, and the second block having a set number other than the determined set number of the first block, and
wherein the grouping unit is further operable to analyze profile information that is generated when a machine language instruction sequence generated from the source program is executed, and to place the data objects included in the source program into the different groups based on a result of the analysis of the profile information.

25. A linker apparatus stored in a computer-readable recording medium, the linker apparatus for causing a computer to link one or more object programs generated by use of a compiler apparatus and generate an executable program,
wherein the compiler apparatus is operable to convert a source program into an object program for use with a computer having a data cache memory and a main memory,
wherein the data cache memory comprises a plurality of blocks, each of the plurality of blocks of the data cache memory being represented by a set number and being a storage unit, wherein the main memory comprises a plurality of blocks, each of the plurality of blocks of the main memory having a set number representing a block of the plurality of blocks of the data cache memory, wherein the compiler apparatus includes:
- a grouping unit operable to analyze grouping information that is used for grouping data objects included in the source program, and place each of the data objects to which accesses are made at similar timings into a respective different group based on a result of the analysis; and
- an object program generation unit operable to generate the object program based on a result of the grouping performed by the grouping unit, the object program not allowing data objects belonging to different groups to be statically laid out in any blocks of the plurality of blocks of the main memory having a same set number on the data cache memory, wherein the linker apparatus comprises:
- a first address setting unit operable to set an address of a first block of the plurality of blocks of the main memory for a data object whose set number has been determined, the first block being where the data object is to be laid out in the main memory, and the first block having the determined set number; and
- a second address setting unit operable to set an address of a second block of the plurality of blocks of the main memory for a data object whose set number has not been determined, the second block being where the data object whose set number has not been determined is to be laid out in the main memory, and the second block having a set number other than the determined set number of the first block, and wherein the grouping unit is further operable to analyze an overlapping of lifetimes of the data objects included in the source program based on the source program, and to place, into mutually different groups, data objects whose lifetimes overlap.

* * * * *